United States Patent
Muramatsu et al.

(10) Patent No.: US 10,560,017 B2
(45) Date of Patent: Feb. 11, 2020

(54) CHARGE PUMP, SWITCH DRIVER DEVICE, LIGHTING DEVICE, AND VEHICLE

(71) Applicant: Rohm Co., Ltd., Kyoto (JP)

(72) Inventors: Yasunori Muramatsu, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 89 days.

(21) Appl. No.: 15/745,272

(22) PCT Filed: Jun. 15, 2016

(86) PCT No.: PCT/JP2016/067785
§ 371 (c)(1),
(2) Date: Jan. 16, 2018

(87) PCT Pub. No.: WO2017/013970
PCT Pub. Date: Jan. 26, 2017

(65) Prior Publication Data
US 2018/0234011 A1 Aug. 16, 2018

(30) Foreign Application Priority Data
Jul. 17, 2015 (JP) ................................ 2015-142723

(51) Int. Cl.
*G05F 1/10* (2006.01)
*G05F 3/02* (2006.01)
(Continued)

(52) U.S. Cl.
CPC ............ *H02M 3/073* (2013.01); *F21S 41/12* (2018.01); *G05F 1/10* (2013.01); *F21Y 2115/10* (2016.08); *H02M 2001/0041* (2013.01)

(58) Field of Classification Search
CPC .. H02M 3/073; H02M 3/07; H02M 2003/077; G11C 5/145; G05F 3/205
(Continued)

(56) References Cited

U.S. PATENT DOCUMENTS 5,012,399 A * 4/1991 Takemura ........... H02M 3/3385
323/902
5,428,496 A * 6/1995 Buchta .................. H01F 7/1816
361/152
(Continued)

FOREIGN PATENT DOCUMENTS

JP          10014218 A    *  1/1998
JP        2005-348561       12/2005
(Continued)

OTHER PUBLICATIONS

Japan Patent Office, International Search Report for PCT/JP2016/067785 dated Jul. 12, 2016 (with English translation).

*Primary Examiner* — Anh Q Tra
(74) *Attorney, Agent, or Firm* — Fish & Richardson P.C.

(57) ABSTRACT

Provided is a charge pump including a flying capacitor, an output capacitor, a switch group arranged to switch connection states of the capacitors so as to generate an output voltage from an input voltage, and a feedback control unit arranged to adjust an interterminal voltage of the flying capacitor to a predetermined target value when charging the same. On the basis of a first node voltage applied to a first terminal of the flying capacitor, the feedback control unit adjusts a second node voltage at a second terminal of the flying capacitor. The feedback control unit includes a voltage detection unit arranged to detect the interterminal voltage of the flying capacitor, and a voltage adjustment unit arranged to adjust the second node voltage according to a result of detection by the voltage detection unit.

16 Claims, 30 Drawing Sheets

(51) Int. Cl.
*H02M 3/07* (2006.01)
*F21S 41/12* (2018.01)
*F21Y 115/10* (2016.01)
*H02M 1/00* (2006.01)

(58) Field of Classification Search
USPC ........................................ 327/536; 363/59–60
See application file for complete search history.

(56) References Cited

U.S. PATENT DOCUMENTS

| | | | | |
|---|---|---|---|---|
| 5,604,387 | A * | 2/1997 | Cheyne | H02M 3/33561 307/125 |
| 5,677,613 | A * | 10/1997 | Perelle | H02J 7/0016 320/122 |
| 6,160,727 | A * | 12/2000 | Liao | H02J 9/02 307/66 |
| 6,812,776 | B2 * | 11/2004 | Henry | H02M 3/07 327/535 |
| 7,746,676 | B2 * | 6/2010 | Feng | H02M 3/07 323/282 |
| 8,659,350 | B2 * | 2/2014 | Putter | H03F 3/005 327/536 |
| 2005/0270086 | A1 | 12/2005 | Sohara | |
| 2007/0159233 | A1 | 7/2007 | Sohara | |
| 2013/0193852 | A1 * | 8/2013 | Frattini | H05B 37/036 315/122 |

FOREIGN PATENT DOCUMENTS

| | | | |
|---|---|---|---|
| JP | 2007288845 A | * | 11/2007 |
| JP | 2008283794 A | * | 11/2008 |
| JP | 2014-045600 | | 3/2014 |
| JP | 2015-074309 | | 4/2015 |
| WO | 2012/144116 | | 10/2012 |

* cited by examiner

CHARGE PUMP, SWITCH DRIVER DEVICE, LIGHTING DEVICE, AND VEHICLE

TECHNICAL FIELD

The present invention relates to a charge pump, a switch driver device using the same, a lighting device, and a vehicle.

BACKGROUND ART

Conventionally, a charge pump, which steps up an input voltage to generate an output voltage by repeating charge and discharge of a flying capacitor and an output capacitor, is used as power supply means for various applications.

Note that Patent Document 1 and Patent Document 2 can be mentioned as examples of conventional techniques related to above description.

LIST OF CITATIONS

Patent Literature

Patent Document 1: JP-A-2005-348561
Patent Document 2: JP-A-2014-045600

SUMMARY OF THE INVENTION

Technical Problem

However, the conventional charge pump has a problem that a terminal voltage of the flying capacitor fluctuates largely due to charge and discharge.

In view of the above-mentioned problem found by the inventors of this application, it is an object of the invention disclosed in this specification to provide a charge pump capable of reducing fluctuation of a terminal voltage of a flying capacitor, a switch driver device using the same, a lighting device, and a vehicle.

Means for Solving the Problem

A charge pump disclosed in this specification includes a flying capacitor, an output capacitor, a switch group arranged to switch connection states of the capacitors so as to generate an output voltage from an input voltage, and a feedback control unit arranged to adjust an interterminal voltage of the flying capacitor to a predetermined target value when charging the flying capacitor (first structure).

The charge pump of the first structure preferably has a structure in which the switch group includes a first switch connected between a first terminal of the flying capacitor and an input terminal of the input voltage, a second switch connected between a second terminal of the flying capacitor and the input terminal of the input voltage, a third switch connected between the first terminal of the flying capacitor and an output terminal of the output voltage, and a fourth switch connected between a second terminal of the flying capacitor and a ground terminal (second structure).

The charge pump of the second structure preferably has a structure in which the feedback control unit adjusts a second node voltage at the second terminal of the flying capacitor on the basis of a first node voltage applied to the first terminal of the flying capacitor (third structure).

The charge pump of the third structure preferably has a structure in which the feedback control unit includes a voltage detection unit arranged to detect the interterminal voltage of the flying capacitor, and a voltage adjustment unit arranged to adjust the second node voltage according to a detection result by the voltage detection unit (fourth structure).

The charge pump of the fourth structure preferably has a structure in which the voltage detection unit includes a resistor having a first terminal connected to the first terminal of the flying capacitor, and a zener diode having a cathode connected to a second terminal of the resistor and an anode connected to the second terminal of the flying capacitor (fifth structure).

The charge pump of the fifth structure preferably has a structure in which the voltage adjustment unit includes an operational amplifier or a comparator arranged to drive the fourth switch according to an interterminal voltage of the resistor (sixth structure).

The charge pump of the sixth structure preferably has a structure in which the voltage adjustment unit further include a pulse generation unit arranged to generate a pulse signal for driving the switch group according to an output signal of the comparator (seventh structure).

The charge pump according to one of the second to seventh structures preferably has a structure in which the switch group further includes a fifth switch connected between the first terminal of the flying capacitor and an input terminal of the power supply voltage, and the flying capacitor is charged using one of the input voltage and the power supply voltage, which is higher (eighth structure).

The charge pump of the first or second structure preferably has a structure in which the feedback control unit variably controls a target value of the interterminal voltage according to the input voltage when charging the flying capacitor (ninth structure).

In addition, a switch driver device disclosed in this specification includes a plurality of channels of switch elements connected in parallel to a plurality of light emitting elements, respectively, a driver portion arranged to individually drive the plurality of switch elements, and the charge pump according to any one of the first to ninth structures, arranged to receive a drive voltage of the plurality of light emitting elements as an input voltage and to output a drive voltage of the driver portion as an output voltage (tenth structure).

In addition, a lighting device disclosed in this specification includes a plurality of light emitting elements, a light emitting element driving device arranged to supply drive current to the plurality of light emitting elements, and the switch driver device according to the tenth structure (eleventh structure).

In addition, a vehicle disclosed in this specification includes the lighting device according to the eleventh structure (twelfth structure).

Advantageous Effects of the Invention

According to the invention disclosed in this specification, it is possible to provide a charge pump capable of reducing fluctuation of a terminal voltage of a flying capacitor, a switch driver device using the same, a lighting device, and a vehicle.

DESCRIPTION OF EMBODIMENTS

<Overall Structure>

Figure 1:
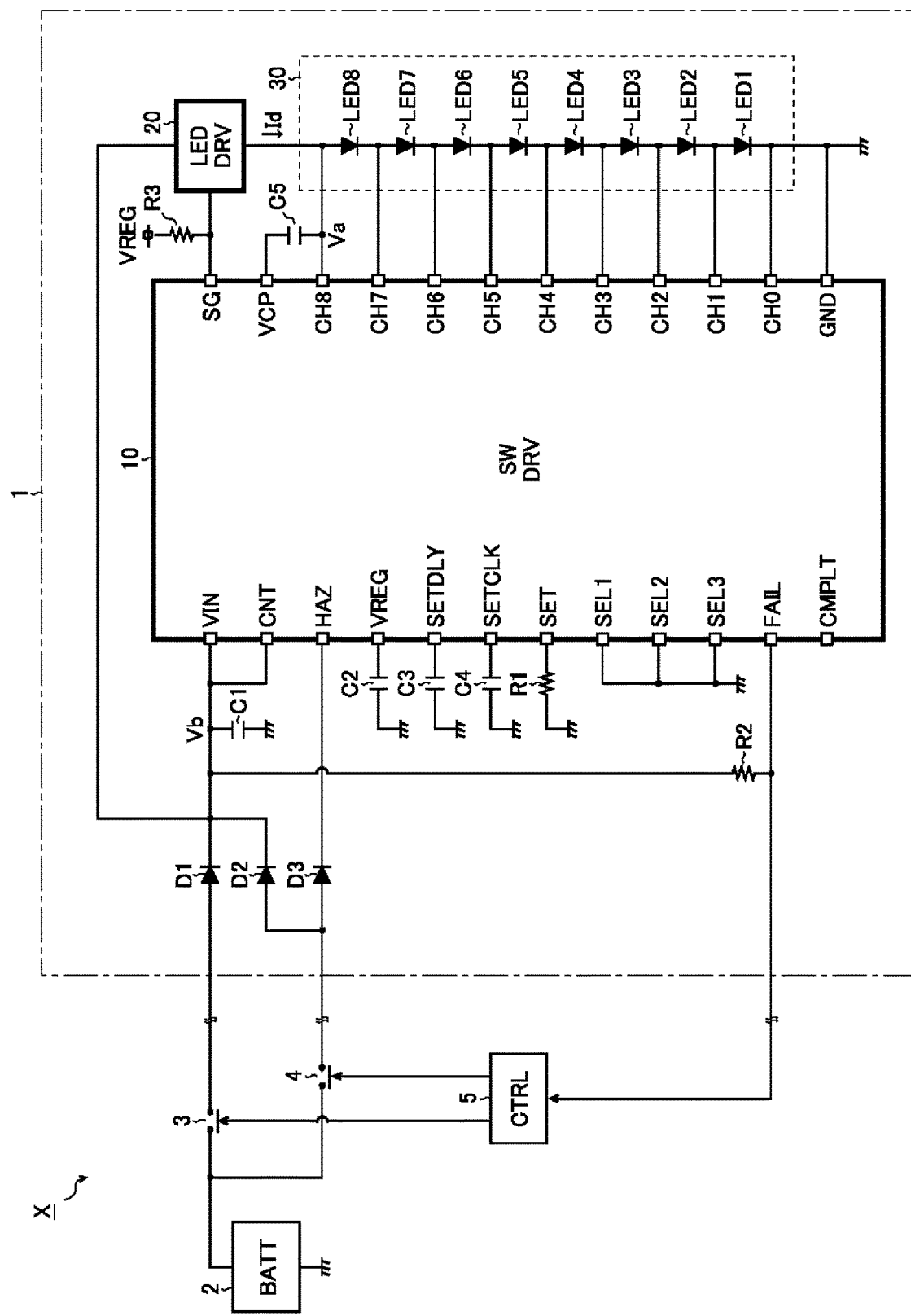
FIG. 1 is an application diagram showing an example of an overall structure of a vehicle in which a lighting device is mounted.

FIG. 1 is an application diagram showing an example of an overall structure of a vehicle X in which a lighting device 1 is mounted. The vehicle X of this structure example is equipped with the lighting device 1, a battery 2, power supply switches 3 and 4, and a controller 5.

The lighting device 1 is a turn lamp or a hazard lamp that blinks when the vehicle X turns right or left, or when changing lanes, or in a hazard.

The battery 2 is a power supply for the vehicle X, and a lead-acid battery or the like is appropriately used as the battery 2.

The power supply switches 3 and 4 are connected in parallel to each other between the lighting device 1 and the battery 2, and they are turned on and off under control by the controller 3.

The controller 5 performs on/off control of the power supply switch 3 responding to operation of a turn lever and performs on/off control of the power supply switch 4 responding to pressing of a hazard button. For example, in a case where the lighting device 1 is a right turn lamp, the controller 5 periodically turns on and off the power supply switch 3 so as to supply power intermittently to the lighting device 1 during a period while the turn lever is operated in a right turning direction. On the other hand, in a case where the lighting device 1 is a left turn lamp, the controller 5 periodically turns on and off the power supply switch 3 so as to supply power intermittently to the lighting device 1 during a period while the turn lever is operated in a left turning direction. In addition, when the hazard button is pressed, the controller 5 periodically turns on and off the power supply switch 4 so as to supply power intermittently to the lighting device 1 regardless of whether the lighting device 1 is the right turn lamp or the left turn lamp. In addition, the controller 5 also has a function of monitoring an abnormality flag of the lighting device 1 (a FAIL terminal voltage of a switch driver device 10) so as to inform a driver of an abnormality.

<Lighting Device>

Next, with reference to FIG. 1, an internal structure of the lighting device 1 is described. The lighting device 1 includes the switch driver device 10, a light emitting element driving device 20, a light emitting element group 30, various discrete components (resistors R1 to R3, capacitors C1 to C5, and diodes D1 to D3).

The switch driver device 10 is a semiconductor integrated circuit device (so-called matrix switch driver IC), which operates with a battery voltage Vb supplied from the battery 2 so as to switch between short-circuit and non-short-circuit of individual light emitting diodes LED1 to LED8 constituting the light emitting element group 30. The switch driver device 10 has a plurality of external terminals (VIN terminal, CNT terminal, HAZ terminal, VREG terminal, SETDLY terminal, SETCLK terminal, SET terminal, SEL1 to SEL3 terminals, FAIL terminal, CMPLT terminal, SG terminal, VCP terminal, CH0 to CH8 terminals, and GND terminal) as means for establishing electric connections with the outside of the device.

The light emitting element driving device 20 is a semiconductor integrated circuit device (so-called light emitting diode (LED) driver IC), which operates with the battery voltage Vb supplied from the battery 2 so as to generate a drive current Id for the light emitting element group 30 (light emitting diodes LED1 to LED8). Note that the light emitting element driving device 20 has a function of monitoring a SG terminal voltage of the switch driver device 10 (corresponding to a current supply start trigger) and waiting to start supplying the drive current Id until an unstable operation period of the switch driver device 10 elapses.

The light emitting element group 30 is a series light emitting body (so-called LED string) including a plurality of light emitting elements (at most eight light emitting diodes LED1 to LED8 in this diagram) connected in series between the light emitting element driving device 20 and a ground terminal. Note that when viewing the light emitting diodes LED1 to LED8 individually, each of them can be understood as a single light emitting diode element, or the plurality of light emitting diode elements can be understood as a set of light emitting elements connected in series or in parallel.

Next, connection states of the various discrete components and the external terminals of the switch driver device 10 are described. The anode of the diode D1 is connected to a first terminal of the power supply switch 3. The anodes of the diodes D2 and D3 are connected to a first terminal of the power supply switch 4. Second terminals of the power supply switches 3 and 4 are connected to a positive terminal of the battery 2. The cathodes of the diodes D1 and D2 are connected to the VIN terminal of the switch driver device 10 and are also connected to a power supply terminal of the light emitting element driving device 20. The cathode of the diode D3 is connected to the HAZ terminal.

The capacitor C1 is connected between the VIN terminal and the ground terminal. The capacitor C2 is connected between the VREG terminal and the ground terminal. The capacitor C3 is connected between the SETDLY terminal and the ground terminal. The capacitor C4 is connected between the SETCLK terminal and the ground terminal. The capacitor C5 is connected between the VCP terminal and the CH8 terminal.

The resistor R1 is connected between the SET terminal and the ground terminal. The resistor R2 is connected between the VIN terminal and the FAIL terminal. The resistor R3 is connected between the VREG terminal and the SG terminal.

The CH0 terminal and the GND terminal of the switch driver device 10 are both connected to the cathode of the light emitting diode LED1 (ground terminal). The CH(k) terminal (k=1, 2, . . . 7) of the switch driver device 10 is connected to the anode of the light emitting diode LED(k) and the cathode of the light emitting diode LED(k+1). The CH8 terminal of the switch driver device 10 is connected to the anode of the light emitting diode LED8.

The CNT terminal of the switch driver device 10 is connected to the VIN terminal. SEL1 to SEL3 terminals are all connected to the ground terminal in order to indicate that there are eight light emitting diodes. The CMPLT terminal is opened. Note that the CNT terminal and the CMPLT terminal of the switch driver device 10 are used when multiple stages of the switch driver devices 10 are connected.

The switch driver device 10 does not need any control signal from a microcomputer when performing sequential lighting control of the light emitting diodes LED1 to LED8 (details will be described later). Therefore, it is not necessary to dispose a microcomputer and a power supply for the microcomputer, and hence the number of components of the lighting device 1 can be reduced. In addition, the number of harnesses connected to the lighting device 1 can also be reduced largely, and hence design of the set can be facilitated, and in addition workload of EMC test countermeasure or abnormality mode verification can be reduced.

Hereinafter, the internal structure and operation of the switch driver device 10 capable of performing the same sequential lighting control as the conventional control without needing microcomputer control is described in detail with reference to the drawings.

<Switch Driver Device>

Figure 2:
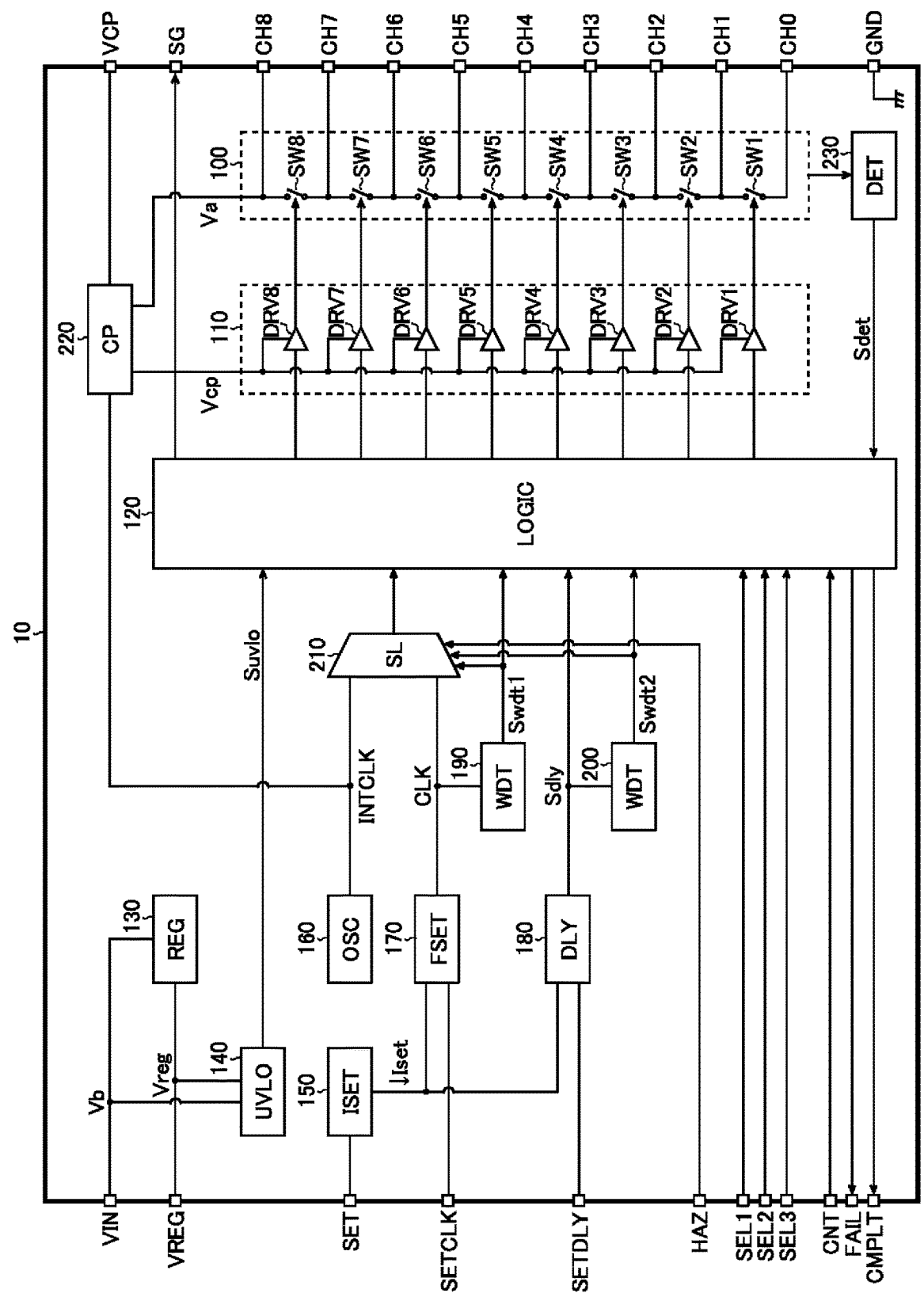
FIG. 2 is a block diagram showing an example of an internal structure of a switch driver device.

FIG. 2 is a block diagram showing an internal structure example of the switch driver device 10. The switch driver device 10 of this structure example includes a switch portion 100, a driver portion 110, a logic portion 120, an internal regulator portion 130, an under voltage lock out (UVLO) portion 140, a current setting portion 150, an oscillator portion 160, a frequency setting portion 170, a start delaying portion 180, a first watchdog timer portion 190, a second watchdog timer portion 200, a selector portion 210, a charge pump unit 220, and an open/short-circuit detection portion 230. Note that arrangement of the external terminals is partially different between FIG. 1 and FIG. 2 for convenience sake of illustration, but external terminals having the same name are associated with each other.

The switch portion 100 includes a plurality of channels (8 channels in this diagram) of switch elements SW1 to SW8. The switch element SWx (x=1, 2, . . . 8) is connected between the CH(x-1) terminal and the CH(x) terminal. Therefore, when the light emitting diode LEDx is externally connected between the CH(x-1) terminal and the CH(x) terminal, the switch element SWx is connected in parallel to the light emitting diode LEDx. Therefore, during the on-period of the switch element SWx, terminals of the light emitting diode LEDx are short-circuited, and hence the light emitting diode LEDx cannot be lighted. On the other hand, during the off-period of the switch element SWx, the terminals of the light emitting diode LEDx are not short-circuited, and hence the light emitting diode LEDx can be lighted.

The driver portion 110 includes drivers DRV1 to DRV8 that drives the switch elements SW1 to SW8 according to an instruction from the logic portion 120. Note that the drivers DRV1 to DRV8 operate with a stepped-up voltage Vcp supplied from the charge pump unit 220.

The logic portion 120 has a main function of automatically starting a series of switch driving sequence so as to sequentially switch on/off the switch elements SW1 to SW8 with a predetermined pattern when power is supplied to the switch driver device 10 (more precisely when a UVLO signal Suvlo becomes a logical level at voltage reduction release).

The internal regulator portion 130 steps down the battery voltage Vb applied to the VIN terminal so as to generate a desired constant voltage Vreg (e.g. 5 V) and outputs the same to the VREG terminal. Note that a low drop out (LDO) regulator or a switching regulator can be appropriately used as the internal regulator portion 130.

A UVLO portion 140 monitors both (or at least one of) the battery voltage Vb and the constant voltage Vreg so as to generate the UVLO signal Suvlo and outputs the same to the logic portion 120. When the battery voltage Vb and the constant voltage Vreg become higher than individual voltage reduction release voltages, the UVLO signal Suvlo becomes the logical level at voltage reduction release (e.g. high level). When the battery voltage Vb and the constant voltage Vreg become lower than individual voltage reduction detection voltages (<voltage reduction release voltages), the UVLO signal Suvlo becomes a logical level when voltage reduction is detected (e.g. low level).

The current setting portion 150 generates a predetermined reference current Iset and output the same to the frequency setting portion 170 and the start delaying portion 180. Note that a current value of the reference current Iset can be adjusted according to a resistance of the resistor R1 externally connected to the SET terminal 150 (see FIG. 1).

The oscillator portion 160 generates an internal clock signal INTCLK (e.g. 2 MHz) necessary for operation of the charge pump unit 220. Note that the internal clock signal INTCLK is output not only to the charge pump unit 220 but also to the selector portion 210.

The frequency setting portion 170 arbitrarily sets an operating frequency of the switch driving sequence using an external element. Specifically, the frequency setting portion 170 generates a variable clock signal CLK (e.g. 500 Hz to 50 kHz), which varies according to a capacitance of the capacitor C4 externally connected to the SETCLK terminal (see FIG. 1) and a current value of the reference current Iset (therefore a resistance of the resistor R1 externally connected to the SET terminal), and outputs the same to the selector portion 210.

The start delaying portion 180 arbitrarily sets a start delay time tDLY of the switch driving sequence using an external element. Specifically, the start delaying portion 180 generates a start delay signal Sdly whose logic change timing varies according to the capacitor C3 externally connected to the SETDLY terminal (see FIG. 1) and a current value of the reference current Iset (therefore the resistance of the resistor R1 externally connected to the SET terminal), and outputs the same to the logic portion 120.

The first watchdog timer portion 190 monitors abnormality of the operating frequency of the switch driving sequence. Specifically, the first watchdog timer portion 190 monitors the variable clock signal CLK so as to generate a first abnormality detection signal Swdt1, and outputs the same to the logic portion 120 and the selector portion 210. For example, the first abnormality detection signal Swdt1 becomes high level when abnormality is not detected, while it becomes low level when abnormality is detected.

The second watchdog timer portion 200 monitors abnormality of the start delay time tDLY of the switch driving sequence. Specifically, the second watchdog timer portion 200 monitors the start delay signal Sdly so as to generate a second abnormality detection signal Swdt2, and outputs the same to the logic portion 120 and the selector portion 210. For example, the second abnormality detection signal Swdt2 becomes high level when abnormality is not detected, while it becomes low level when abnormality is detected.

The selector portion 210 selectively outputs one of the internal clock signal INTCLK and the variable clock signal CLK to the logic portion 120. More specifically, when a HAZ terminal voltage is at low level (i.e. a logical level when the hazard lamp does not light) and when both the first abnormality detection signal Swdt1 and the second abnormality detection signal Swdt2 are high level (a logical level when abnormality is not detected), the selector portion 210 selects the variable clock signal CLK and outputs the same to the logic portion 120. On the other hand, when the HAZ terminal voltage is at high level (i.e. a logical level when the hazard lamp lights), or when at least one of the first abnormality detection signal Swdt1 and the second abnormality detection signal Swdt2 is at low level (i.e. a logical level when abnormality is detected), the selector portion 210 selects the internal clock signal INTCLK and outputs the same to the logic portion 120.

The charge pump unit 220 steps up an anode voltage Va of the light emitting element group 30, which is applied to the CH8 terminal, using the capacitor C5 externally connected to the VCP terminal (see FIG. 1), and outputs the stepped-up voltage Vcp as a drive voltage of the driver portion 110.

The open/short-circuit detection portion 230 monitors a node voltage at each of the CH0 to CH8 terminals so as to generate an open/short detection signal Sdet, and outputs the same to the logic portion 120. Note that the open/short detection signal Sdet becomes the logical level when abnormality is not detected (e.g. high level) when no abnormality occurs in each of the light emitting diodes LED1 to LED8, while it becomes the logical level when abnormality is detected (e.g. low level) when abnormality occurs in at least one of the light emitting diodes LED1 to LED8.

<Switch Driving Sequence>

Figure 3:
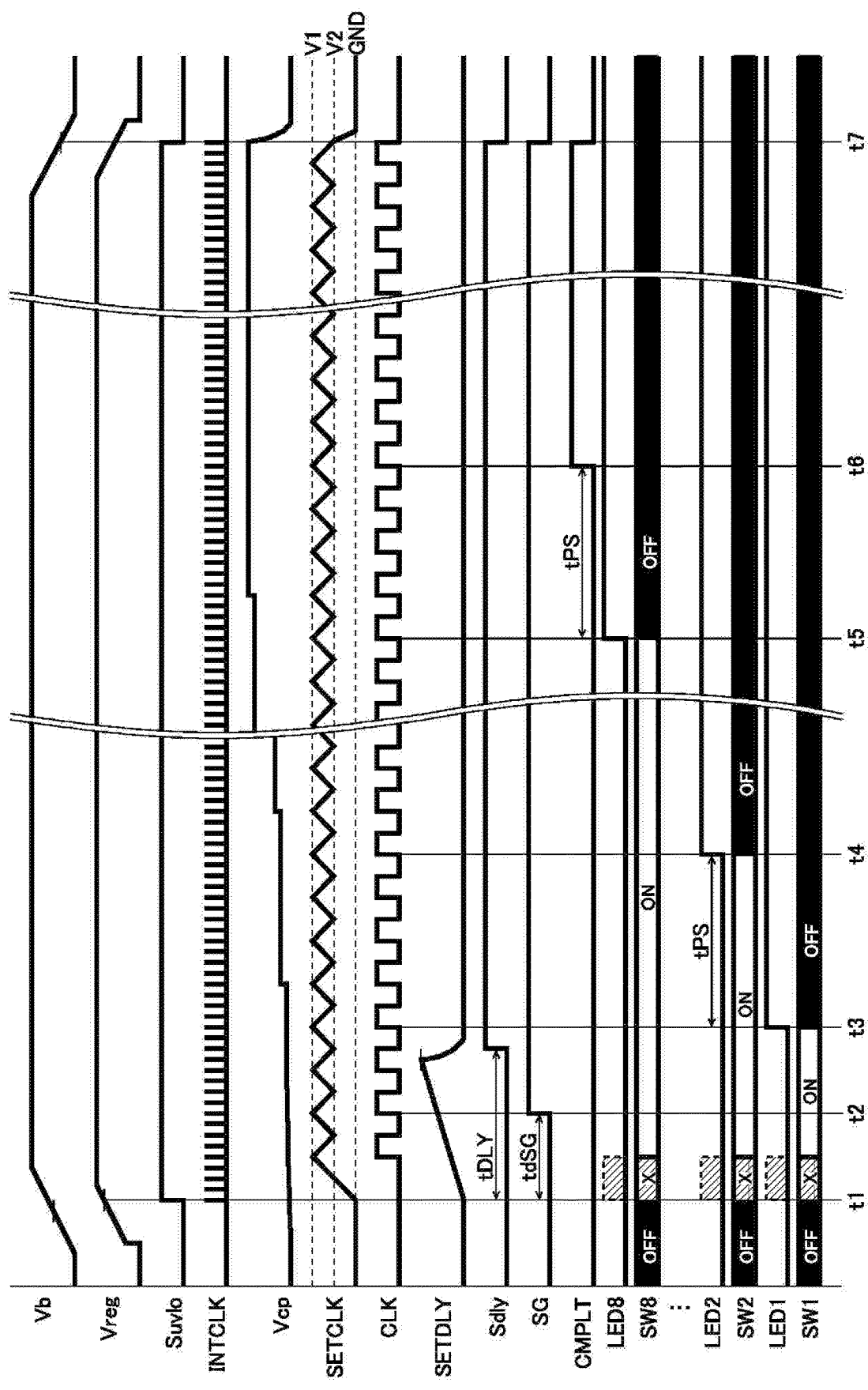
FIG. 3 is a timing chart showing an example of a switch driving sequence.

FIG. 3 is a timing chart showing an example of the switch driving sequence, in which the battery voltage Vb, the constant voltage Vreg, the UVLO signal Suvlo, the internal clock signal INTCLK, the stepped-up voltage Vcp, a SETCLK terminal voltage, the variable clock signal CLK, a SETDLY terminal voltage, the start delay signal Sdly, the SG terminal voltage, a CMPLT terminal voltage, an on/off state (H: on, L: off) of the LED* (*=8, 7, . . . 1), and an on/off state of the switch element SW* are shown in order from top to bottom.

Note that pulses of the internal clock signal INTCLK and the variable clock signal CLK are shown larger than actual size for convenience sake of illustration. Therefore, a time width of the start delay time tDLY, a current supply wait time tdSG, or a lighting transition time tPS does not necessarily match a pulse count number in this chart.

After turning on the power supply to the switch driver device 10, at time point t1, the UVLO signal Suvlo rises to high level (i.e. the logical level at voltage reduction release), and hence the operation of generating the internal clock signal INTCLK and the variable clock signal CLK is started, so that individual portions of the switch driver device 10 are enabled to operate.

In this case, the logic portion 120 controls the driver portion 110 to initialize the switch elements SW1 to SW8 from off to on. However, at time point t1, the step-up operation of the charge pump unit 220 has just started so that the output operation of the driver portion 110 is unstable. Therefore, an unstable operation period of the switch elements SW1 to SW8 (see hatched areas with symbol x) is generated. Therefore, if the light emitting element driving device 20 outputs the drive current Id before this unstable operation period, the light emitting diodes LED1 to LED8 may momentarily light without intention.

Therefore, after the unstable operation period of the switch elements SW1 to SW8, before starting the switch driving sequence, the logic portion 120 outputs the current supply start trigger for the light emitting diodes LED1 to LED8 to the light emitting element driving device 20 in the outside. More specifically, the logic portion 120 sets the SG terminal voltage to low level (i.e. a logical level when waiting for current supply) during the unstable operation period of the switch elements SW1 to SW8. At time point t2 when the current supply wait time tdSG elapses from the time point t1, the SG terminal voltage is raised from low level to high level (i.e. a logical level at current supply wait release).

With this structure, during an operation inappropriate period of the switch elements SW1 to SW8, the light emitting element driving device 20 does not output the drive current Id, and hence momentary lighting of the light emitting diodes LED1 to LED8 can be avoided.

Note that the output timing of the current supply start trigger described above may be the above-mentioned time point when the current supply wait time tdSG elapses from the time point t1, or may be a time point when output levels of the drivers DRV1 to DRV8 become higher than a predetermined threshold value.

After that, when the predetermined start delay time tDLY elapses from the timAe point t1 so that the start delay signal Sdly rises to high level, the logic portion 120 turns off the switch elements SW1 to SW8 sequentially in an accumulating manner every lighting transition time tPS corresponding to the variable clock signal CLK after the time point t3. For example, the lighting transition time tPS is set to a value corresponding to 256 counts of the variable clock signal CLK. In this case, when the variable clock signal CLK has an oscillation frequency of 5.12 kHz, the lighting transition time tPS becomes 50 msec.

When the switch elements SW1 to SW8 are turned off sequentially in an accumulating manner as described above, the number of turned-on light emitting diodes LED1 to LED8 is gradually increased, and hence an area of lighted region is increased as time elapses. In other words, when the series of switch driving sequence is completed, the switch elements SW1 to SW8 are all turned off, so that all the light emitting diodes LED1 to LED8 are lighted. Note that in order to shift the lighted region in a flowing manner, the switch elements SW1 to SW8 should be sequentially turned off in an exclusive manner.

After all the switch elements SW1 to SW8 are turned off at time point t5, the logic portion 120 further raises the CMPLT terminal voltage to high level at time point t6 when the lighting transition time tPS elapses. Note that the CMPLT terminal is an external terminal that is used when a plurality of switch driver device 10 are serially connected.

After that, when the power supply to the switch driver device 10 is stopped, the UVLO signal Suvlo drops to low level (i.e. the logical level when voltage reduction is detected) at time point t7, and hence the operation of generating the internal clock signal INTCLK and the variable clock signal CLK is stopped, so that individual portions of the switch driver device 10 are disabled to operate. In this case, because the switch elements SW1 to SW8 are already turned off, the problem of momentary lighting does not occur unlike the case when the power supply is turned on.

Note that the series of switch driving sequence described above is performed every time when the power supply switch 3 or the power supply switch 4 is periodically turns on and off so that on and off of the power supply to the switch driver device 10 is repeated.

Charge Pump Unit (First Embodiment)

Figure 4:
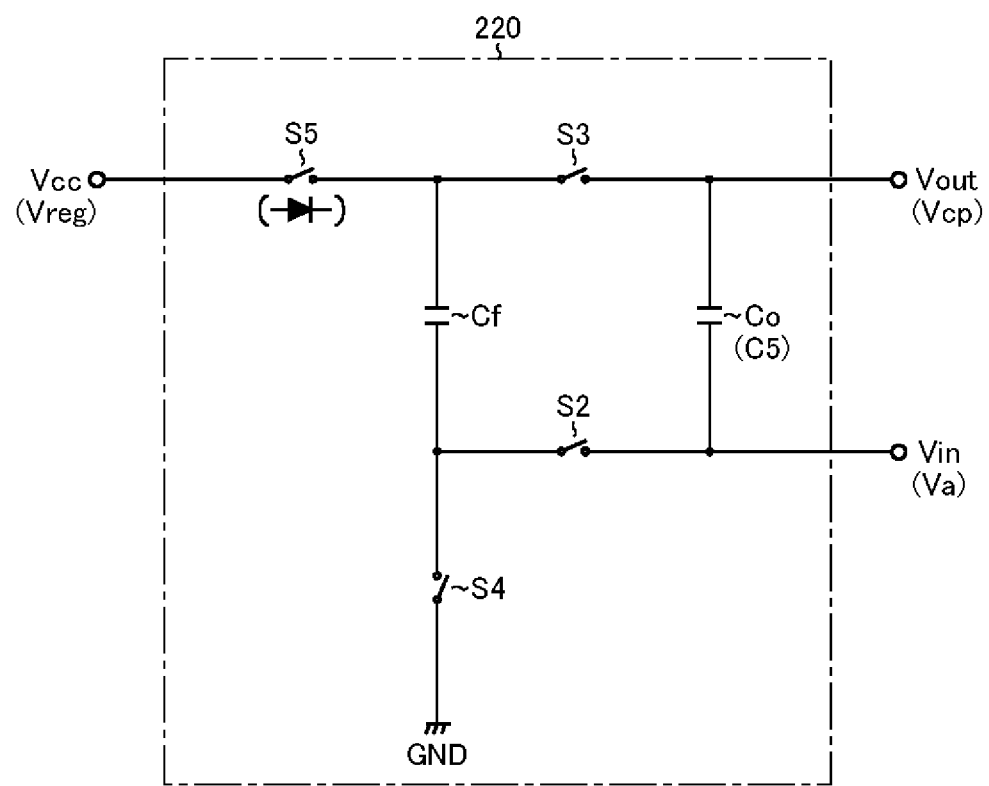
FIG. 4 is a circuit diagram showing a first embodiment of a charge pump unit.

FIG. 4 is a circuit diagram showing a first embodiment of the charge pump unit 220. The charge pump unit 220 of this embodiment includes a flying capacitor Cf, an output capacitor Co, a switch group (i.e. switches S2 to S5) arranged to switch connection states of the capacitors Cf and Co so as to generate an output voltage Vout (i.e. the stepped-up voltage Vcp) from an input voltage Vin (i.e. the anode voltage Va).

The switch S2 is connected between a second terminal of the flying capacitor Cf and an input terminal of the input voltage Vin (i.e. the anode voltage Va).

The switch S3 is connected between a first terminal of the flying capacitor Cf and an output terminal of the output voltage Vout (i.e. the stepped-up voltage Vcp).

The switch S4 is connected between the second terminal of the flying capacitor Cf and the ground terminal (i.e. an application terminal of the ground voltage GND).

The switch S5 is connected between the first terminal of the flying capacitor Cf and an input terminal of a power supply voltage Vcc (i.e. the constant voltage Vreg). Note that as the switch S5, for example, it is possible to appropriately use a diode having an anode connected to the input terminal of the power supply voltage Vcc and a cathode connected to a first terminal of a flying capacitor Cf1.

A first terminal of the output capacitor Co is connected to the output terminal of the output voltage Vout. A second terminal of the output capacitor Co is connected to the input terminal of the input voltage Vin.

Figure 5:
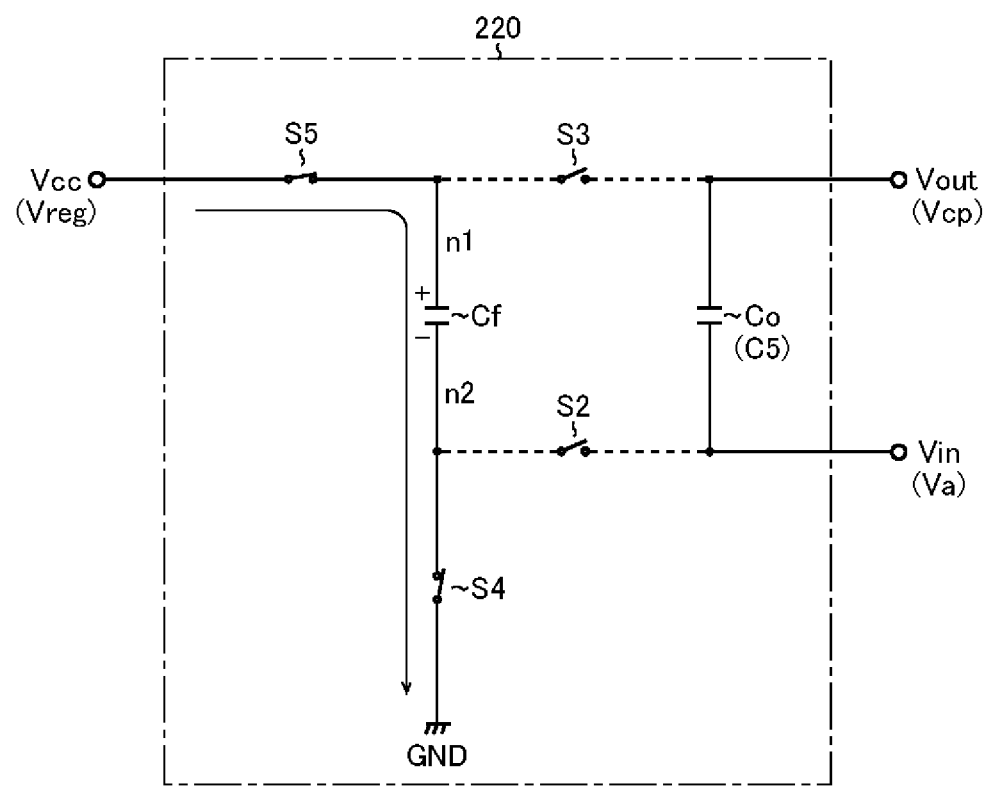
FIG. 5 is a circuit diagram showing an operating state in a first phase.

FIG. 5 is a circuit diagram showing an operating state of the charge pump unit 220 in a first phase. As shown in this diagram, in the first phase, the switches S2 and S3 are turned off, while the switches S4 and S5 are turned on. As a result, current flows in the path from the input terminal of the power supply voltage Vcc to the ground terminal via the flying capacitor Cf. In this case, a first node voltage n1 at the first terminal of the flying capacitor Cf is substantially equal to the power supply voltage Vcc, and a second node voltage n2 at the second terminal of the flying capacitor Cf is substantially equal to the ground voltage GND. Therefore, the flying capacitor Cf is charged until its interterminal voltage becomes substantially equal to the power supply voltage Vcc. In this way, the first phase corresponds to a charging phase of the flying capacitor Cf.

Figure 6:
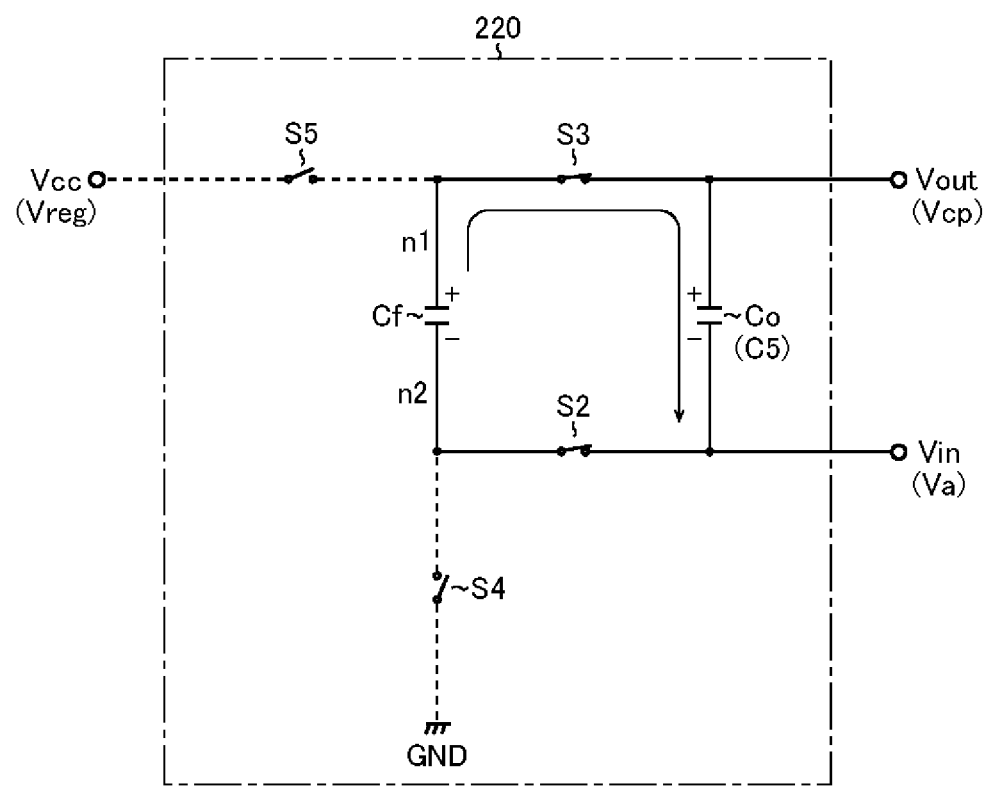
FIG. 6 is a circuit diagram showing an operating state in a second phase.

FIG. 6 is a circuit diagram showing an operating state of the charge pump unit 220 in a second phase. As shown in this diagram, in the second phase, the switches S2 and S3 are turned on, while the switches S4 and S5 are turned off. As a result, the flying capacitor Cf and the output capacitor Co are connected in parallel to each other between the output terminal of the output voltage Vout and the input terminal of the input voltage Vin. Therefore, charge redistribution is performed between the flying capacitor Cf and the output capacitor Co until they have the same interterminal voltage. In this way, the second phase corresponds to a discharge phase of the flying capacitor Cf (i.e. a charge transfer phase from the flying capacitor Cf to the output capacitor Co).

Figure 7:
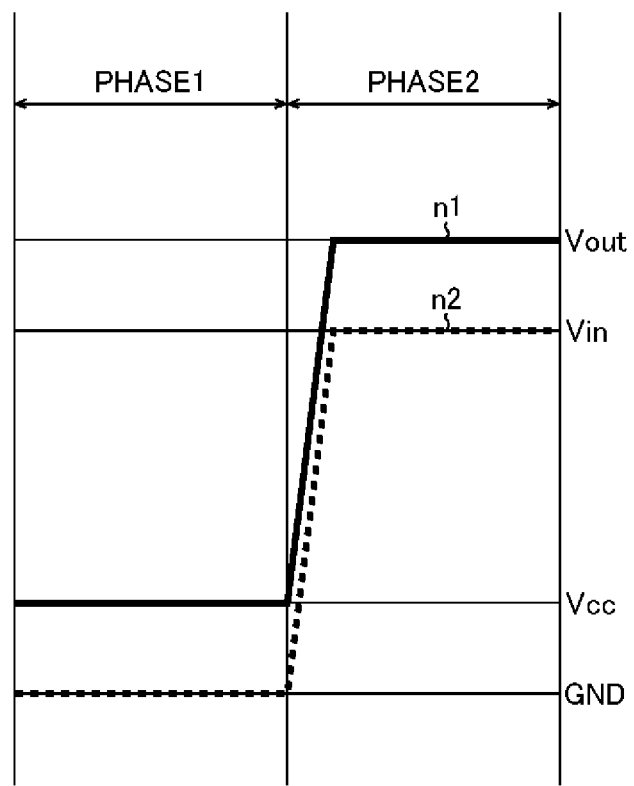
FIG. 7 is a voltage waveform chart showing a node voltage transition between phases.

FIG. 7 is a voltage waveform chart showing transition behavior between the phases of the first node voltage n1 (solid line) and the second node voltage n2 (broken line).

As described above, in the first phase, n1 is nearly equal to Vcc, while n2 is nearly equal to GND, and hence the flying capacitor Cf is charged to almost the power supply voltage Vcc. After that, when the first phase is switched to the second phase, the second node voltage n2 is raised to almost the input voltage Vin. In this case, according to charge conservation law of the flying capacitor Cf, the first node voltage n1 is raised up to the output voltage Vout (≈Vin+Vcc) that is the sum of the second node voltage n2 Vin) and the interterminal voltage of the flying capacitor Cf (≈Vcc).

In this way, the charge pump unit 220 of the first embodiment can generate the output voltage Vout that is the stepped-up voltage of the input voltage Vin, by repeating charge and discharge of the flying capacitor Cf and the output capacitor Co.

However, the charge pump unit 220 of the first embodiment has to change the second node voltage n2 largely between the ground voltage GND and the input voltage Vin every time when switching between the first phase and the second phase. Therefore, it is necessary to set a capacitance of the flying capacitor Cf to a large value so as to be hardly affected by a parasitic capacitor, and therefore it is disadvantageous for downsizing the switch driver device 10. In particular, as the number of LEDs of the light emitting element group 30 is larger, the input voltage Vin (i.e. the anode voltage Va) becomes higher, and hence the above-mentioned problem becomes obvious.

Charge Pump Unit (Second Embodiment)

Figure 8:
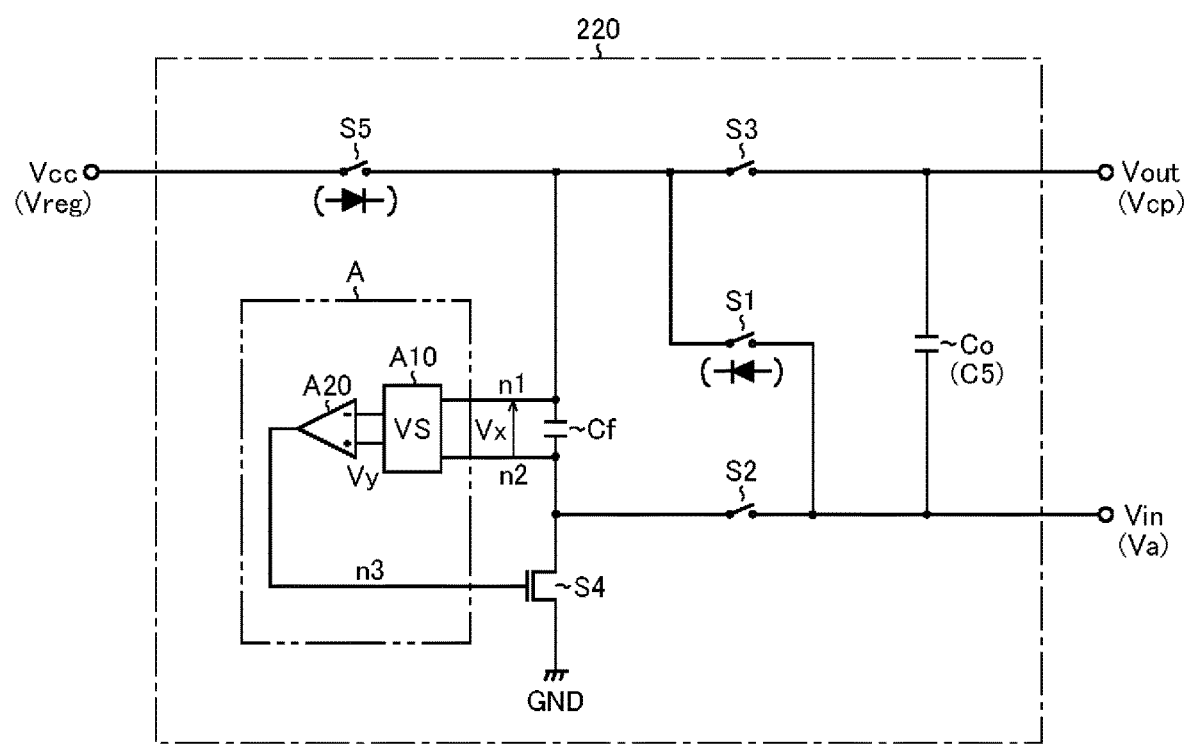
FIG. 8 is a circuit diagram showing a second embodiment of the charge pump unit.

FIG. 8 is a circuit diagram showing a second embodiment of the charge pump unit 220. This embodiment is based on the first embodiment described above and is characterized in that it further includes a switch S1 and a feedback control unit A. Therefore, the same structural element as in the first embodiment is denoted by the same numeral or symbol as in FIG. 4 so that overlapping description is omitted, and characteristic parts of the second embodiment are mainly described below.

The switch S1 is connected between the first terminal of the flying capacitor Cf and the input terminal of the input voltage Vin (i.e. the anode voltage Va). Note that as the switch S1, for example, it is possible to appropriately use a diode having an anode connected to the input terminal of the input voltage Vin and a cathode connected to the first terminal of the flying capacitor Cf1.

The feedback control unit A includes a voltage detection unit A10 and an operational amplifier A20, and it adjusts an interterminal voltage Vx of the flying capacitor Cf when charging the same to a predetermined target value (i.e. a breakdown voltage Vth of a zener diode A12 described later), by adjusting the second node voltage n2 on the basis of the first node voltage n1.

The voltage detection unit A10 receives inputs of the first node voltage n1 and the second node voltage n2 so as to detect the interterminal voltage Vx of the flying capacitor Cf.

The operational amplifier A20 functions as a voltage adjustment unit that controls conductivity of the switch S4 so as to adjust the second node voltage n2, by generating a gate voltage n3 of the switch S4 (an N-channel metal oxide semiconductor (MOS) field-effect transistor in the example of this diagram), according to a detection result by the voltage detection unit A10 (i.e. an interterminal voltage Vy of a resistor A11 described later).

Figure 9:
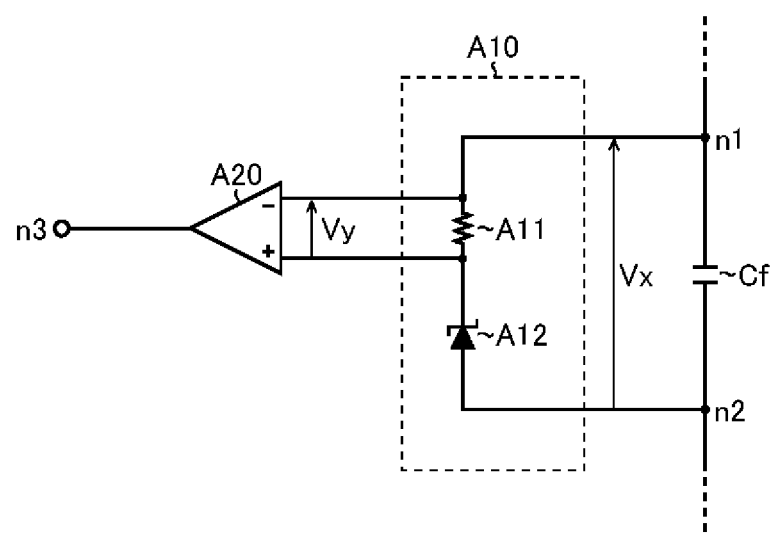
FIG. 9 is a circuit diagram showing one structure example of a voltage detection unit.

FIG. 9 is a circuit diagram showing one structure example of the voltage detection unit A10. The voltage detection unit A10 of this structure example includes the resistor A11 and the zener diode A12. A first terminal of the resistor A11 is connected to an application terminal of the first node voltage n1 (i.e. the first terminal of the flying capacitor Cf) and an inverting input terminal (−) of the operational amplifier A20. A second terminal of the resistor A11 is connected to the cathode of the zener diode A12 and a noninverting input terminal (+) of the operational amplifier A20. The anode of the zener diode A12 is connected to an application terminal of the second node voltage n2 (i.e. the second terminal of the flying capacitor Cf).

When the interterminal voltage Vx (=n1−n2) of the flying capacitor Cf is lower than the breakdown voltage Vth (e.g. 5 V) of the zener diode A12, current does not flow in the resistor A11. Therefore, the interterminal voltage Vy of the resistor A11 becomes 0 V. Note that the operational amplifier A20 is supplied with an intentional input offset so that the noninverting input terminal (+) becomes dominant to the inverting input terminal (−) in some degree. Therefore, during a period of Vy=0 V, the gate voltage n3 generated by the operational amplifier A20 is maintained at high level.

On the other hand, when the interterminal voltage Vx of the flying capacitor Cf becomes higher than the breakdown voltage Vth of the zener diode A12, current starts to flow in the resistor A11. Therefore, as the interterminal voltage Vx of the flying capacitor Cf becomes higher, the interterminal voltage Vy of the resistor A11 becomes higher, and hence the gate voltage n3 generated by the operational amplifier A20 becomes lower.

Next, the charge pump operation in the second embodiment is described in detail in two cases: one is a low input case (Vth≥Vcc>Vin) in which the number of LEDs is small, and the other is a high input case (Vcc≤Vth<Vin) in which the number of LEDs is large.

Figure 10:
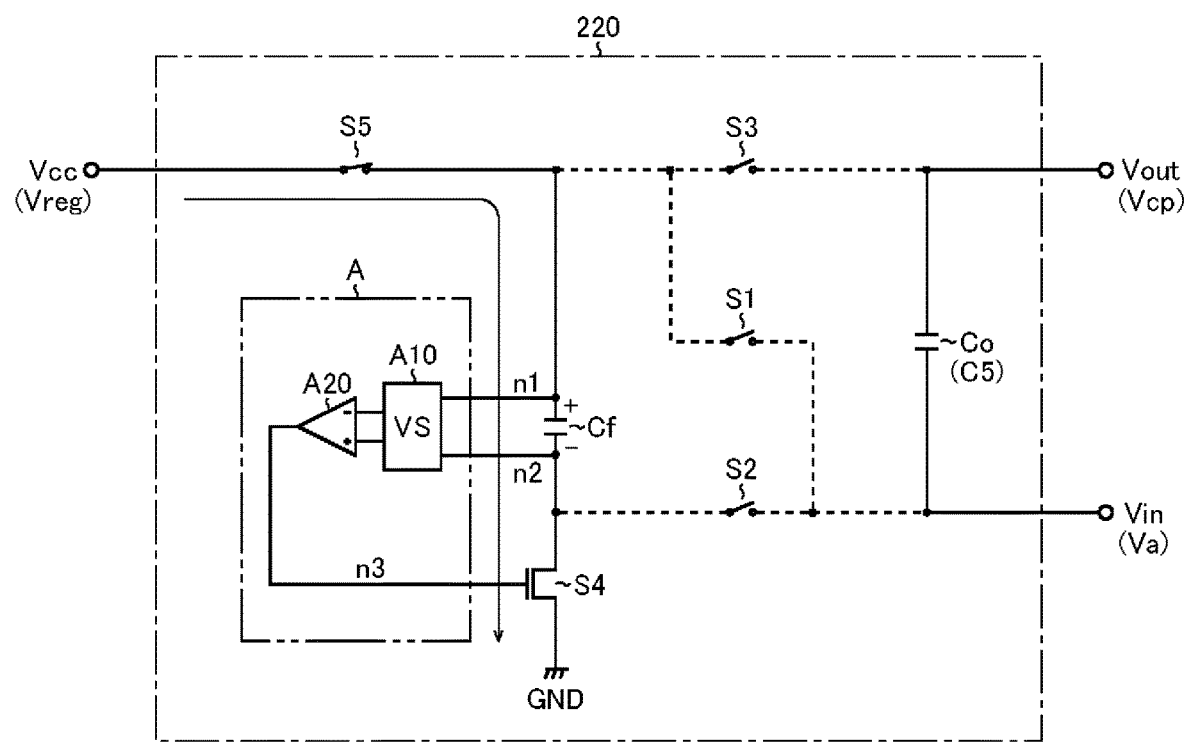
FIG. 10 is a circuit diagram showing an operating state in the first phase (Vcc>Vin).

FIG. 10 is a circuit diagram showing an operating state of the charge pump unit 220 in the first phase of the low input case (Vth≥Vcc>Vin). As shown in this diagram, in the first phase of the low input case, the switches S1 to S3 are turned off, while the switches S4 and S5 are turned on. As a result, current flows in the path from the input terminal of the power supply voltage Vcc to the ground terminal via the flying capacitor Cf.

In this way, in the first phase of the low input case, the switch S1 is turned off while the switch S5 is turned on, and hence the flying capacitor Cf is charged using the power supply voltage Vcc as a higher voltage between the power supply voltage Vcc and the input voltage Vin.

In addition, in the first phase of the low input case, the interterminal voltage Vx of the flying capacitor Cf is always lower than the breakdown voltage Vth of the zener diode A12. In this case, the gate voltage n3 is saturated to high level, and hence the switch S4 is always turned on. Therefore, the flying capacitor Cf is charged until the interterminal voltage Vx thereof becomes almost the power supply voltage Vcc.

Figure 11:
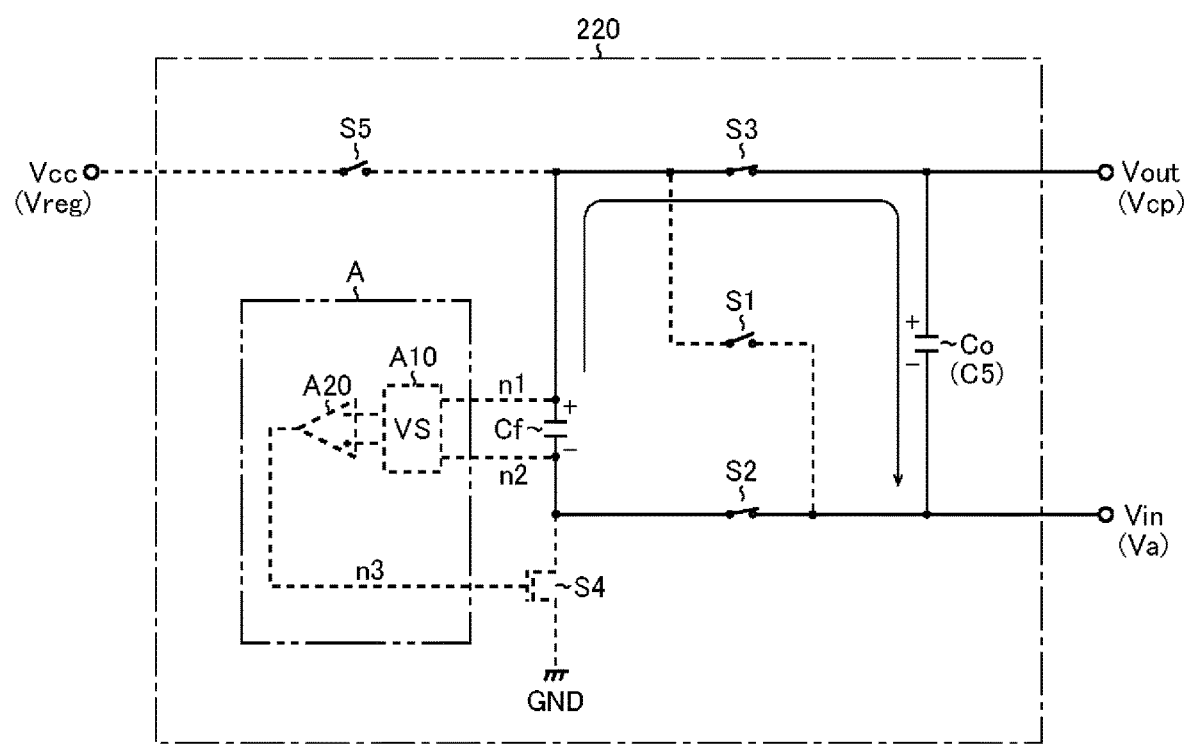
FIG. 11 is a circuit diagram showing an operating state in the second phase (Vcc>Vin).

FIG. 11 is a circuit diagram showing an operating state of the charge pump unit 220 in the second phase of the low input case (Vth≥Vcc>Vin). As shown in this diagram, in the second phase of the low input case, the switches S2 and S3 are turned on, while the switches S1, S4, and S5 are turned off. As a result, the flying capacitor Cf and the output capacitor Co are connected in parallel to each other between the output terminal of the output voltage Vout and the input terminal of the input voltage Vin, and the charge redistribution is performed until the interterminal voltages of them become equal to each other.

Note that when the switch S4 is turned off in the second phase, the output terminal of the operational amplifier A20 (i.e. the gate of the switch S4) is short-circuited to the ground terminal so that the gate voltage n3 is forced to drop to low level.

Figure 12:
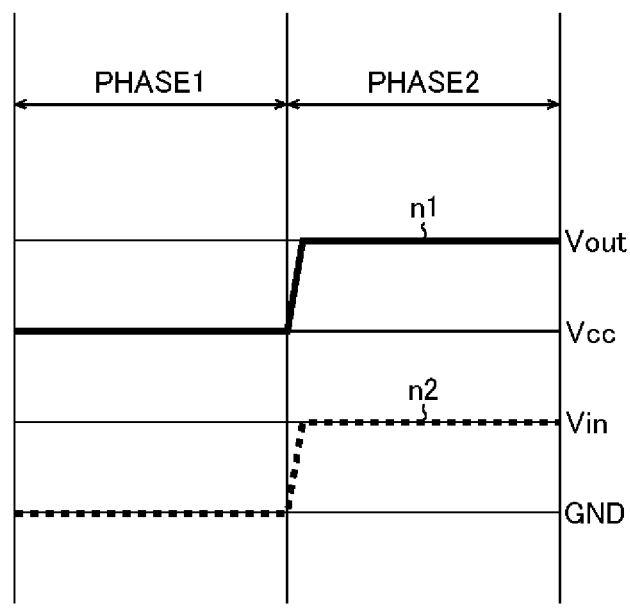
FIG. 12 is a voltage waveform chart showing a node voltage transition between the phases (Vcc>Vin).

FIG. 12 is a voltage waveform chart showing a transition behavior between the phases of the first node voltage n1 (solid line) and the second node voltage n2 (broken line) in the low input case (Vth≥Vcc>Vin).

In the first phase, n1 becomes nearly equal to Vcc, while n2 becomes nearly equal to GND, and hence the flying capacitor Cf is charged to almost the power supply voltage Vcc. After that, when the first phase is switched to the second phase, the second node voltage n2 is raised to almost the input voltage Vin. In this case, according to charge conservation law of the flying capacitor Cf, the first node voltage n1 is raised up to the output voltage Vout (≈Vin+Vcc) that is the sum of the second node voltage n2 (≈Vin) and the interterminal voltage Vx of the flying capacitor Cf (≈Vcc).

In this way, in the low input case (Vth≥Vcc>Vin), also in the charge pump unit 220 of the second embodiment, basically the same step-up operation as in the first embodiment described above is performed. However, because the input voltage Vin is low, a fluctuation width (swing level) of the second node voltage n2 is never large.

Figure 13:
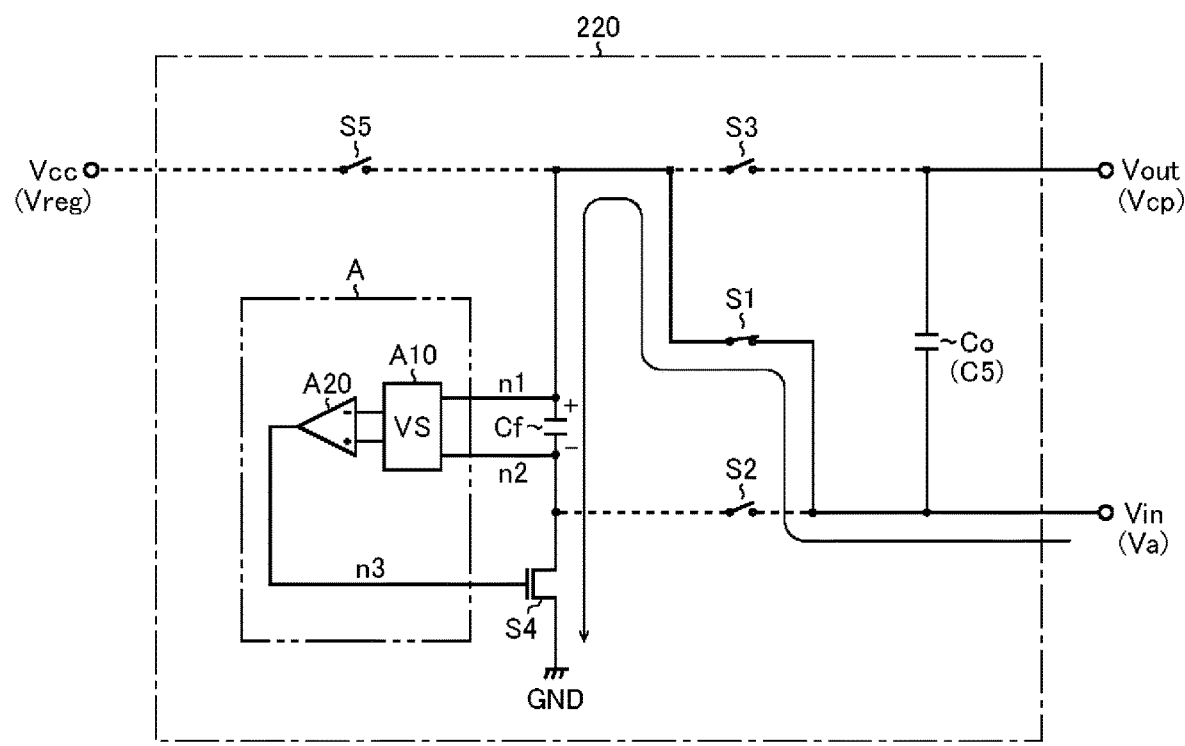
FIG. 13 is a circuit diagram showing an operating state in the first phase (Vcc<Vin).

FIG. 13 is a circuit diagram showing an operating state of the charge pump unit 220 in the first phase of the high input case (Vcc≤Vth<Vin). As shown in this diagram, in the first phase of the high input case, the switches S2, S3, and S5 are turned off, while the switches S1 and S4 are turned on. As a result, current flows in the path from the input terminal of the input voltage Vin to the ground terminal via the flying capacitor Cf.

In this way, in the first phase of the high input case, the switch S1 is turned on while the switch S5 is turned off, and hence the flying capacitor Cf is charged using the input voltage Vin as a higher voltage between the power supply voltage Vcc and the input voltage Vin.

In addition, in the first phase of the high input case, as the interterminal voltage Vx of the flying capacitor Cf is higher, the interterminal voltage Vy of the resistor A11 becomes higher, and hence the gate voltage n3 generated by the operational amplifier A20 becomes lower. In other words, conductivity of the switch S4 is variably controlled according to the interterminal voltage Vx of the flying capacitor Cf, and thus the second node voltage n2 is adjusted.

Figure 14:
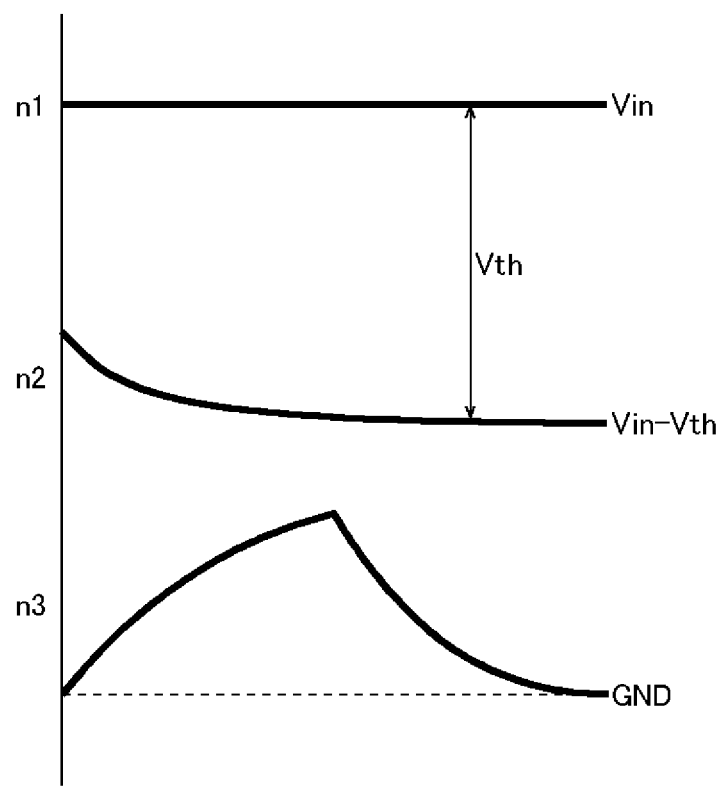
FIG. 14 is a voltage waveform chart showing an adjustment operation of a second node voltage (Vcc<Vin).

FIG. 14 is a voltage waveform chart showing an adjustment operation of the second node voltage n2, in which the first node voltage n1, the second node voltage n2, and the gate voltage n3 are shown in order from top to bottom. As shown in this diagram, the gate voltage n3 rises when the interterminal voltage Vx (=n1−n2) of the flying capacitor Cf is lower than the breakdown voltage Vth of the zener diode A12, while it changes to drop when the interterminal voltage Vx becomes higher than the breakdown voltage Vth.

By controlling conductivity of the switch S4 using the gate voltage n3, the second node voltage n2 is adjusted to a target value (i.e. Vin−Vth) that is lower than the first node voltage n1 (i.e. the input voltage Vin) as a fixed reference value by a predetermined value (i.e. Vth). Note that the target value of the second node voltage n2 (i.e. a charge level of the flying capacitor Cf) can be set to an arbitrary value by the voltage detection unit A10 as long as it is below a maximum voltage of the flying capacitor Cf and a maximum voltage of elements used in the voltage detection unit A10.

Note that an operating state of the charge pump unit 220 in the second phase of the high input case (Vcc≤Vth<Vin) is the same as that in the low input case (Vth≥Vcc>Vin), and hence it can be understood by referring to FIG. 11 described above. In other words, in the second phase of the high input case, the switches S2 and S3 are turned on, while the switches S1, S4, and S5 are turned off. As a result, the flying capacitor Cf and the output capacitor Co are connected in parallel to each other between the output terminal of the output voltage Vout and the input terminal of the input voltage Vin, and the charge redistribution is performed until the interterminal voltages of them become equal to each other.

Figure 15:
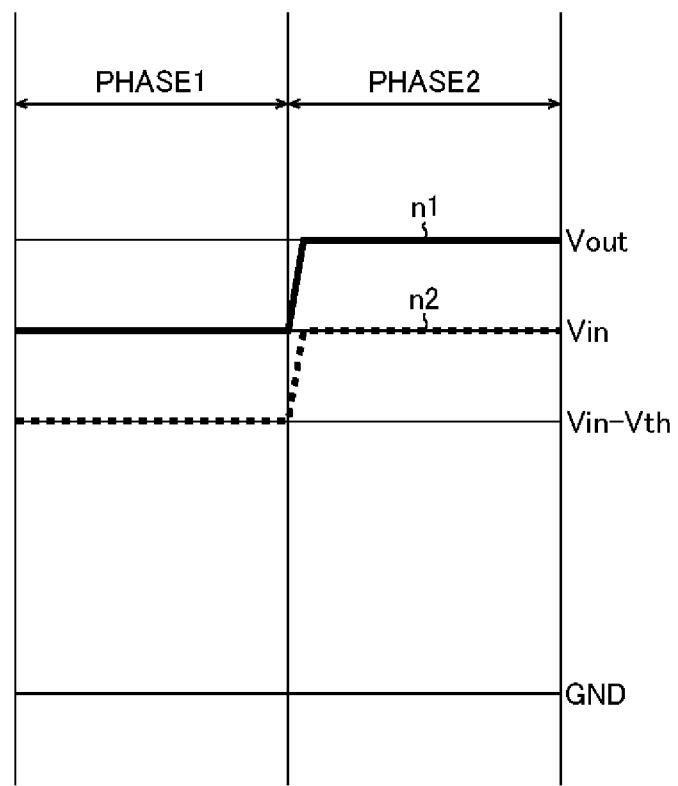
FIG. 15 is a voltage waveform chart showing a node voltage transition between the phases (Vcc<Vin).

FIG. 15 is a voltage waveform chart showing a transition behavior between phases of the first node voltage n1 (solid line) and the second node voltage n2 (broken line) in the high input case (Vcc≤Vth<Vin).

In the first phase, n1 becomes nearly equal to Vcc, while n2 becomes nearly equal to Vin−Vth, and hence the flying capacitor Cf is charged to almost the breakdown voltage Vth. After that, when the first phase is switched to the second phase, the second node voltage n2 is raised to almost the input voltage Vin. In this case, according to charge conservation law of the flying capacitor Cf, the first node voltage n1 is raised up to the output voltage Vout (≈Vin+Vth) that is the sum of the second node voltage n2 (≈Vin) and the interterminal voltage Vx of the flying capacitor Cf (≈Vth).

In this way, in the charge pump unit 220 of the second embodiment, compared with the first embodiment (FIG. 7) described above, the fluctuation width (swing level) of the second node voltage n2 can be suppressed to a lower value. Therefore, it is not necessary to set a large capacitance of the flying capacitor Cf so as not to be affected by the parasitic capacitor, and hence it is advantageous for downsizing the switch driver device 10.

Charge Pump Unit (Third Embodiment)

Figure 16:
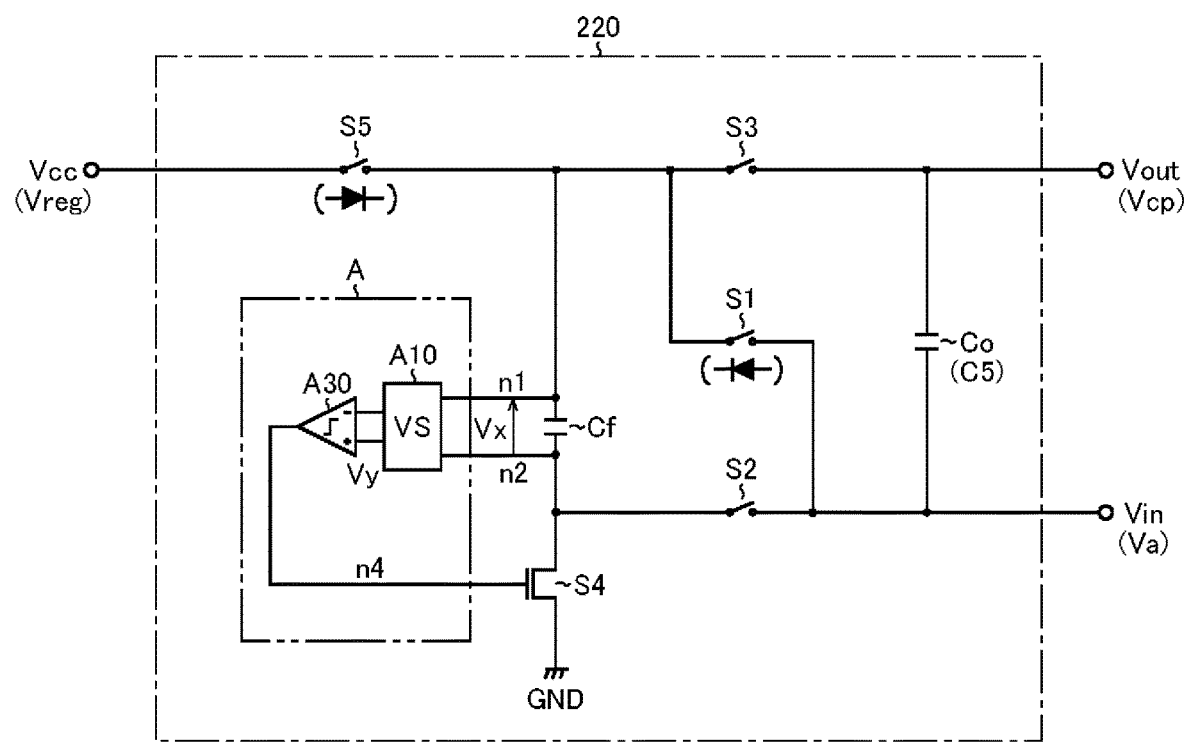
FIG. 16 is a circuit diagram showing a third embodiment of the charge pump unit.

FIG. 16 is a circuit diagram showing a third embodiment of the charge pump unit 220. The third embodiment is basically the same as the second embodiment described above and has a structure in which the operational amplifier A20 is replaced with a hysteresis comparator A30. Therefore, the same structural element as in the second embodiment is denoted by the same numeral or symbol as in FIG. 8 so that overlapping description is omitted, and characteristic parts of the third embodiment are mainly described below.

The hysteresis comparator A30 functions as a voltage adjustment unit, which generates a comparison signal n4 (corresponding to a gate voltage of the switch S4) according to a detection result by the voltage detection unit A10 (i.e. the interterminal voltage Vy of the resistor A11), so as to turn on/off the switch S4 and to adjust the second node voltage n2.

Note that the charge pump operation itself is basically the same as that in the second embodiment, and hence it can be understood with reference to FIGS. 10 to 13, and 15. In the following description, as a difference from the second embodiment, the adjustment operation of the second node voltage n2 in the first phase of the high input case (Vcc≤Vth<Vin) is described with reference to FIG. 17.

Figure 17:
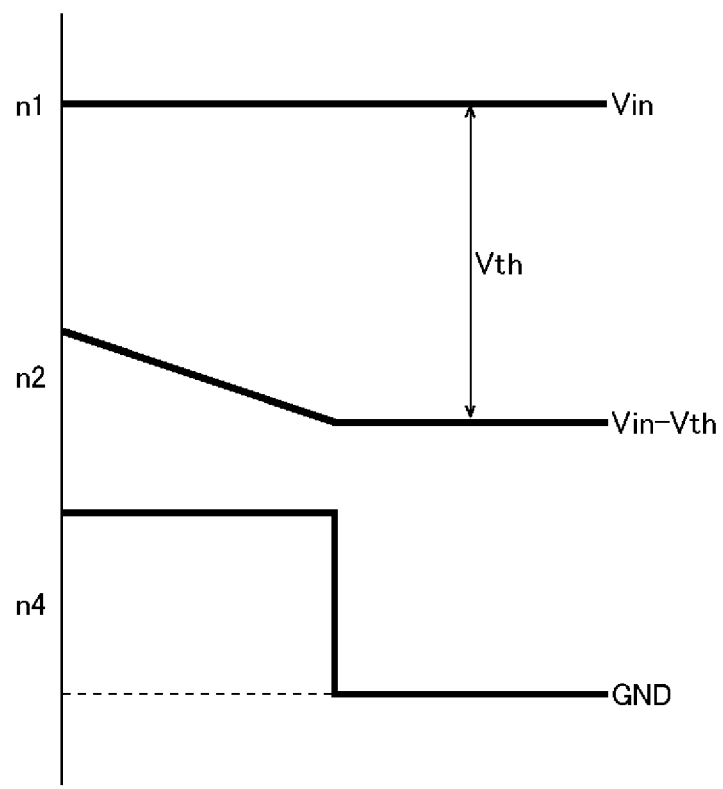
FIG. 17 is a voltage waveform chart showing an adjustment operation of the second node voltage.

FIG. 17 is a voltage waveform chart showing the adjustment operation of the second node voltage n2, in which the first node voltage n1, the second node voltage n2, and the comparison signal n4 are shown in order from top to bottom. As shown in this diagram, when the interterminal voltage Vx (=n1−n2) of the flying capacitor Cf is lower than the breakdown voltage Vth of the zener diode A12, the comparison signal n4 becomes high level, while when the interterminal voltage Vx is higher than the breakdown voltage Vth, the comparison signal n4 drops to low level.

By turning on/off the switch S4 using the comparison signal n4, the second node voltage n2 is adjusted to a target value (i.e. Vin−Vth) that is lower than the first node voltage n1 (i.e. input voltage Vin) as a fixed reference value by a predetermined value (i.e. Vth).

Charge Pump Unit (Fourth Embodiment)

Figure 18:
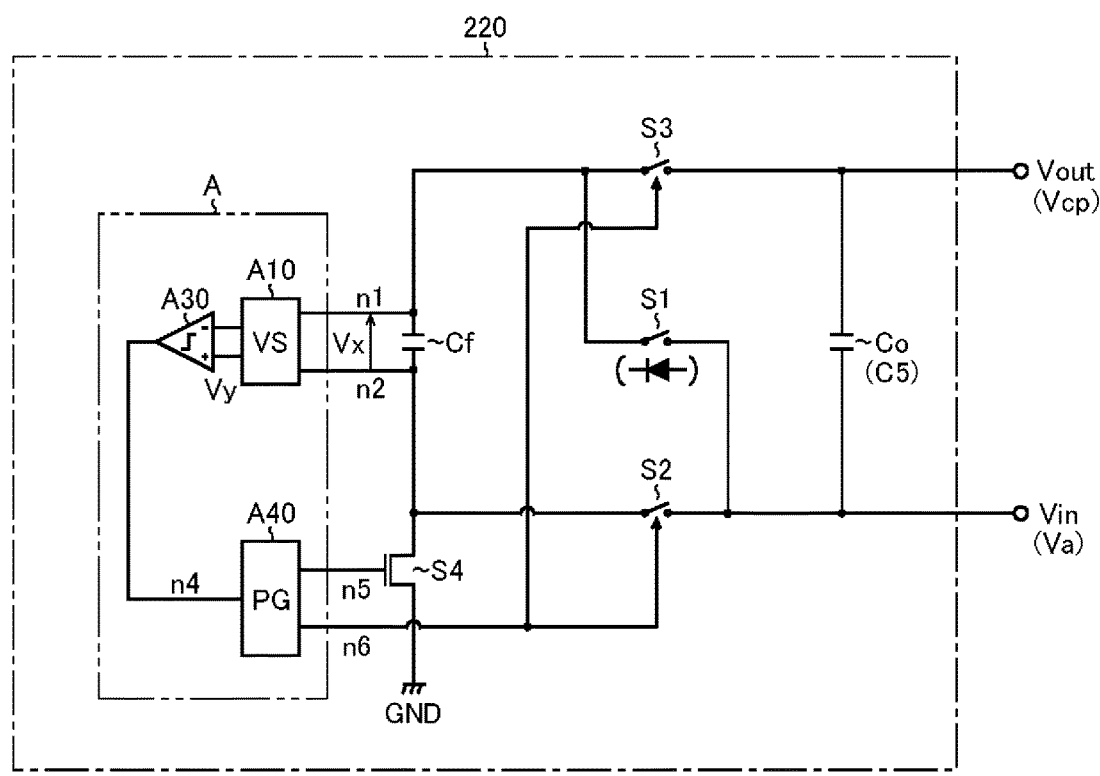
FIG. 18 is a circuit diagram showing a fourth embodiment of the charge pump unit.

FIG. 18 is a circuit diagram showing a fourth embodiment of the charge pump unit 220. The fourth embodiment is based on the third embodiment described above and is characterized in that it further includes a pulse generation unit A40. Therefore, the same structural element as in the third embodiment is denoted by the same numeral or symbol as in FIG. 16 so that overlapping description is omitted, and characteristic parts of the fourth embodiment are mainly described below.

The pulse generation unit A40 generates a first pulse signal n5 for driving the switch S4 and a second pulse signal n6 for driving the switches S2 and S3 according to the comparison signal n4 output from the hysteresis comparator A30.

Note that the switch S4 is turned on when the first pulse signal n5 is at high level, while it is turned off when the first pulse signal n5 is at low level. In addition, the switches S2 and S3 are both turned on when the second pulse signal n6 is at high level, while they are turned off when the second pulse signal n6 is at low level.

Figure 19:
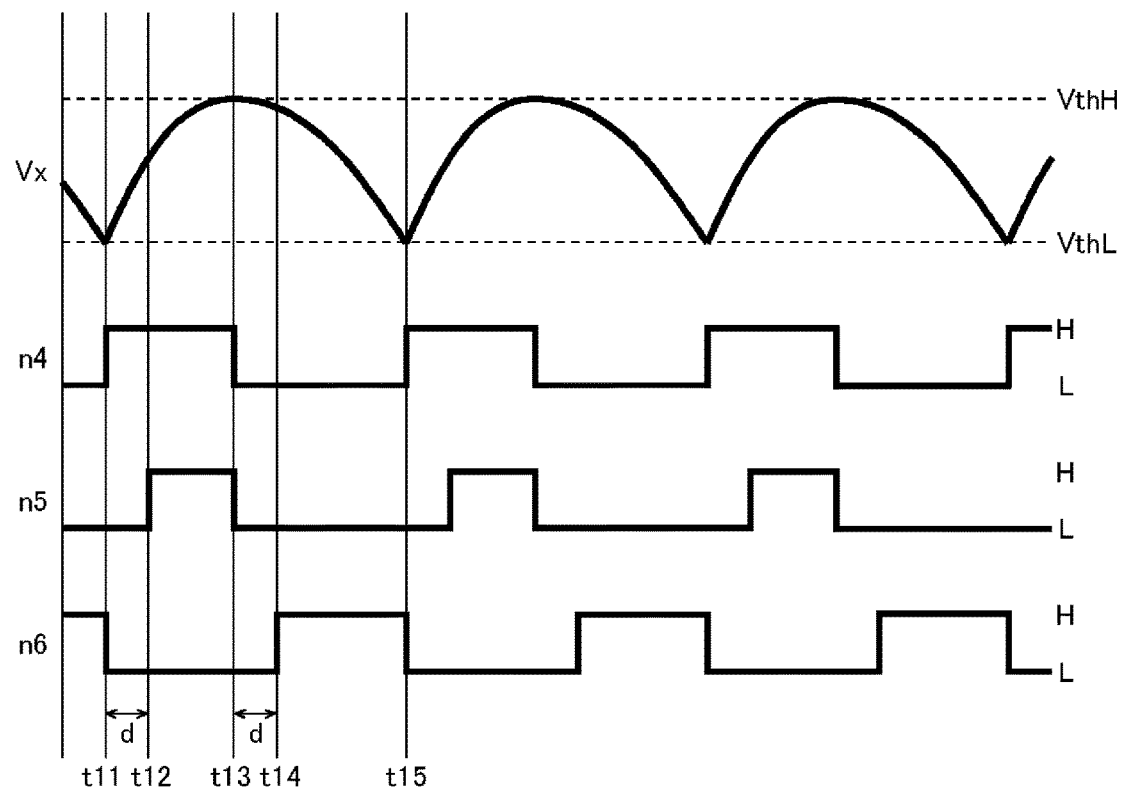
FIG. 19 is a timing chart showing an example of a pulse generation operation.

FIG. 19 is a timing chart showing an example of a pulse generation operation, in which the interterminal voltage Vx of the flying capacitor Cf, the comparison signal n4, the first pulse signal n5, and the second pulse signal n6 are shown in order from top to bottom.

When the interterminal voltage Vx becomes lower than a lower side threshold value voltage VthL at time point t11, the comparison signal n4 rises from low level to high level. At this time point, the first pulse signal n5 is continuously maintained at low level, and the second pulse signal n6 is decreased from high level to low level.

At time point t12 when a predetermined delay time d elapses from time point t11, the first pulse signal n5 is raised from low level to high level, and the second pulse signal n6 is continuously maintained at low level.

When the interterminal voltage Vx becomes higher than an upper side threshold value voltage VthH (e.g. the breakdown voltage Vth of the zener diode A12) at time point t13, the comparison signal n4 drops from high level to low level. At this time point, the first pulse signal n5 is decreased from high level to low level, and the second pulse signal n6 is continuously maintained at low level.

At time point t14 when a predetermined delay time d elapses from time point t13, the first pulse signal n5 is continuously maintained at low level, and the second pulse signal n6 is raised from low level to high level.

Also after time point t15, the pulse generation operation described above is repeated. As a result, the first pulse signal n5 and the second pulse signal n6 become pulse signals having logical levels basically inverted from each other.

Note that the period (from time point t12 to time point t13) during which the first pulse signal n5 is at high level while the second pulse signal n6 is at low level corresponds to the first phase for charging the flying capacitor Cf. On the contrary, the period (time point t14 to time point t15) during which the first pulse signal n5 is at low level while the second pulse signal n6 is at high level corresponds to the second phase discharging the flying capacitor Cf.

In addition, the period (from time point t11 to time point t12, and from time point t13 to time point t14), during which the first pulse signal n5 and the second pulse signal n6 simultaneously become low level, corresponds to a dead time during which the switches S2 to S4 are simultaneously turned off. By setting the dead time, excessive through current can be prevented.

As understood also from the pulse generation operation described above, the pulse generation unit A40 is designed assuming that the comparison signal n4 is pulse-driven, and the situation that the comparison signal n4 is saturated to high level, i.e. the situation corresponding to the low input case (Vth≥Vcc>Vin) described above is not assumed. Therefore, the charge pump unit 220 of the fourth embodiment does not include the switch S5 forming a supply path of the power supply voltage Vcc, and only the input voltage Vin is used for charging the flying capacitor Cf (see FIG. 18 described above).

Figure 20:
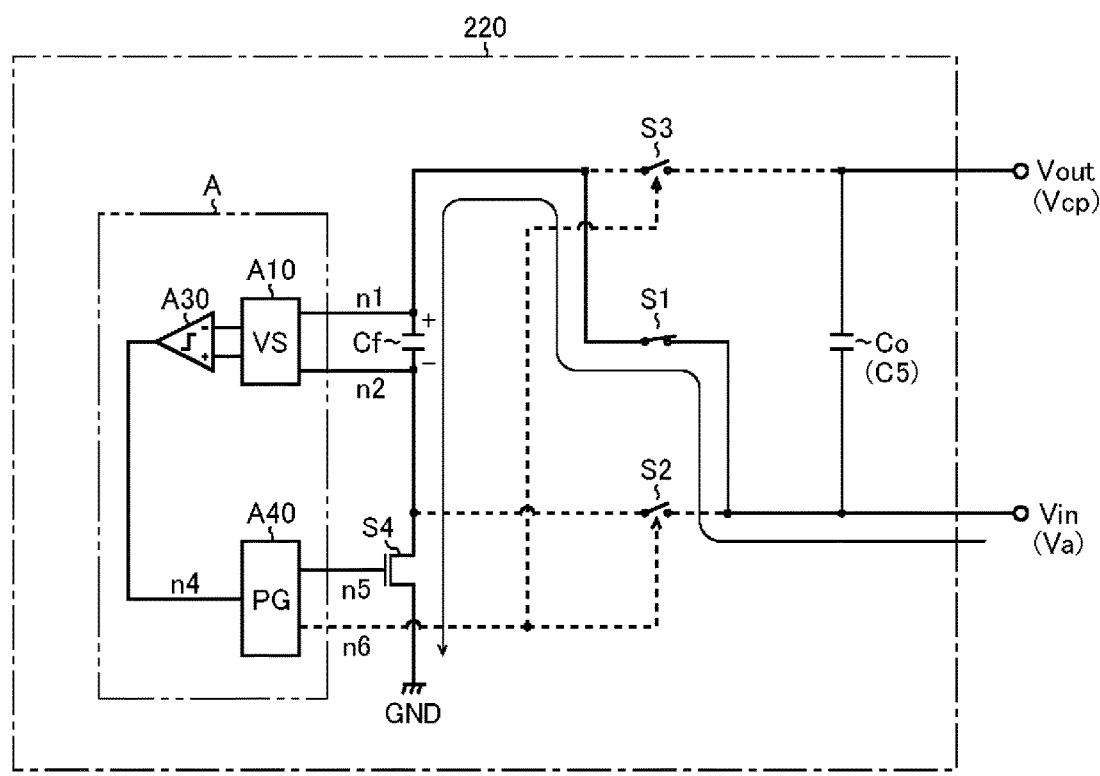
FIG. 20 is a circuit diagram showing an operating state in the first phase.

FIG. 20 is a circuit diagram showing an operating state of the charge pump unit 220 in the first phase. As shown in this diagram, in the first phase, the switches S2 and S3 are turned off while the switches S1 and S4 are turned on. As a result, current flows in the path from the input terminal of the input voltage Vin to the ground terminal via the flying capacitor Cf. In addition, in the first phase, by turning on/off the switch S4 according to the interterminal voltage Vx of the flying capacitor Cf, the second node voltage n2 is adjusted.

Figure 21:
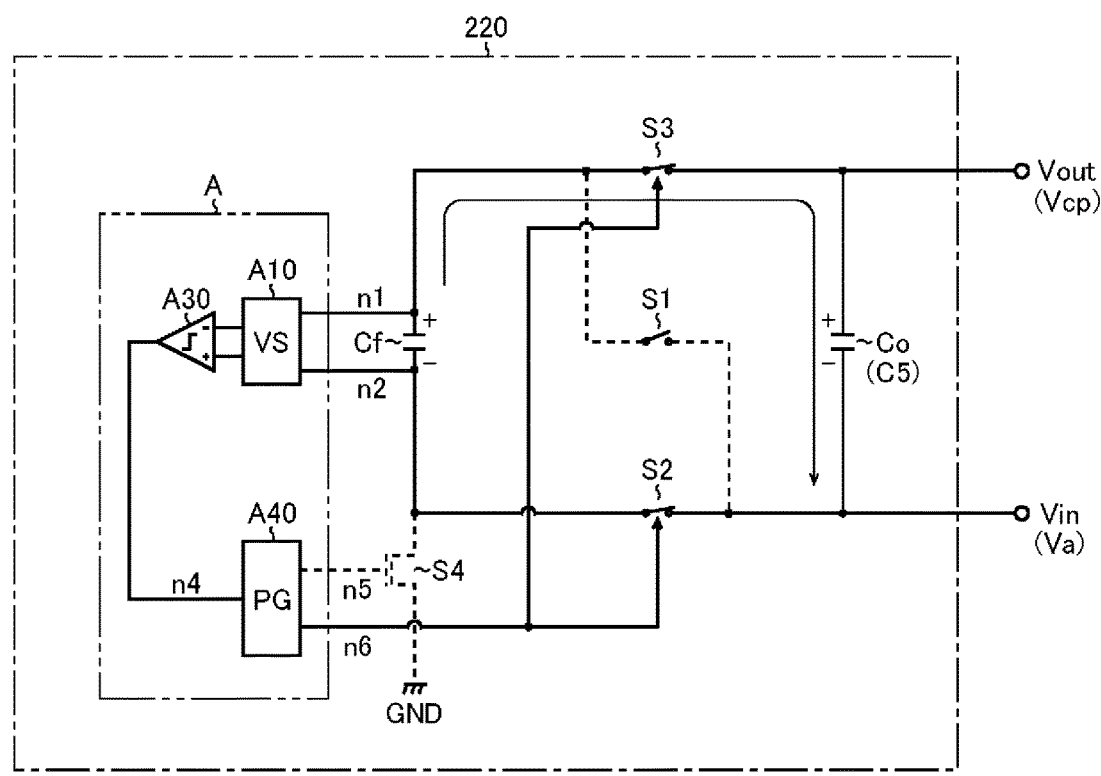
FIG. 21 is a circuit diagram showing an operating state in the second phase.

FIG. 21 is a circuit diagram showing an operating state of the charge pump unit 220 in the second phase. As shown in this diagram, in the second phase, the switches S2 and S3 are turned on while the switches S1 and S4 are turned off. As a result, the flying capacitor Cf and the output capacitor Co are connected in parallel to each other between the output terminal of the output voltage Vout and the input terminal of the input voltage Vin, and the charge redistribution is performed until the interterminal voltages of them become equal to each other.

In this way, the charge pump unit 220 of the fourth embodiment can appropriately drive the switch group based on a result of monitoring the interterminal voltage Vx of the flying capacitor Cf without being supplied with a clock signal.

<Variations>

Figure 22:
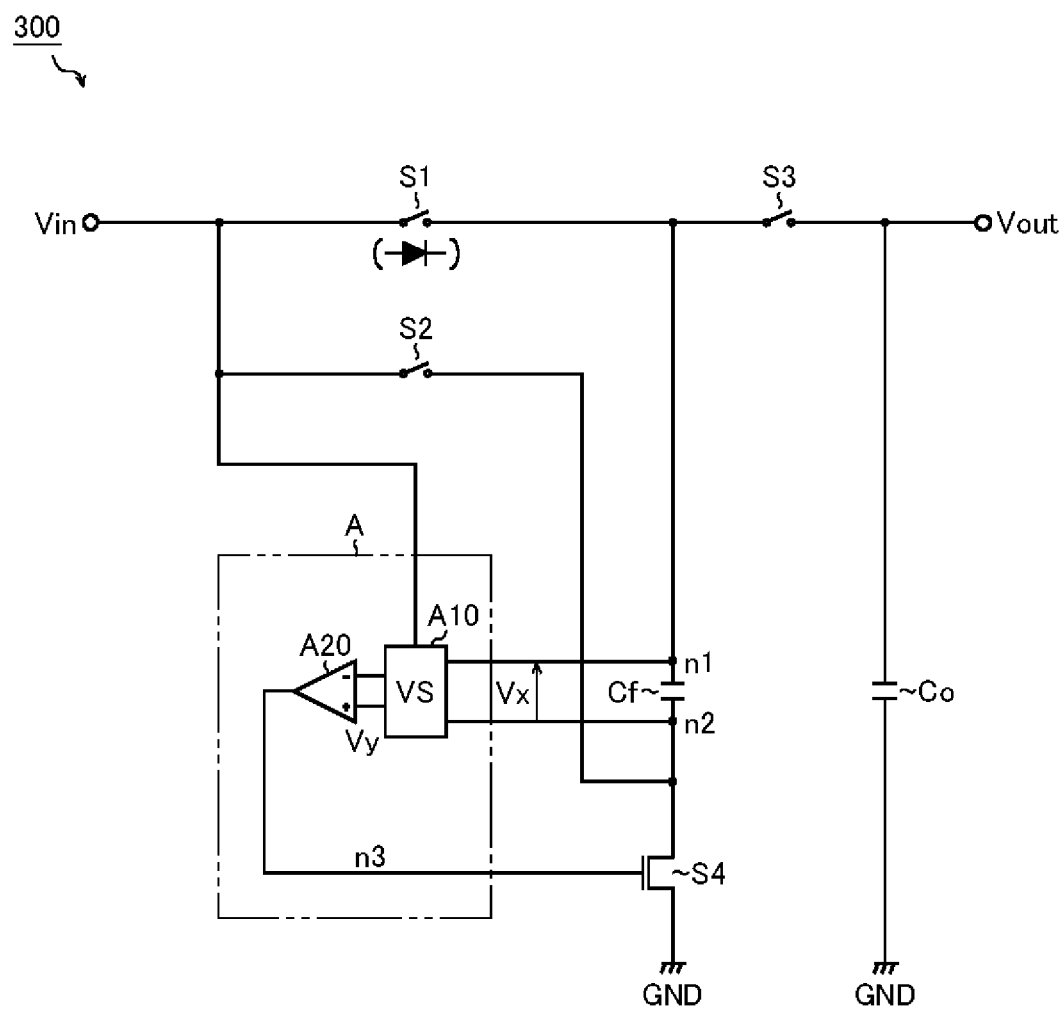
FIG. 22 is a circuit diagram showing one variation of the charge pump.

FIG. 22 is a circuit diagram showing one variation of the charge pump. A charge pump 300 of this variation is used as power supply means of various applications without being limited to the use as the charge pump unit 220 described above.

However, the structure itself is based on the second embodiment described above and is characterized in that the feedback control unit A variably controls a target value of the interterminal voltage Vx (i.e. the target value of the second node voltage n2) according to the input voltage Vin when charging the flying capacitor Cf Therefore, the same structural element as in the first embodiment is denoted by the same numeral or symbol as in FIG. 8 so that overlapping description is omitted, and characteristic parts of this variation are mainly described below.

In the charge pump 300 of this variation, the voltage detection unit A10 included in the feedback control unit A has a function of variably controlling the target value of the second node voltage n2 (e.g. the breakdown voltage Vth of the zener diode A12 included in the voltage detection unit A10) according to the input voltage Vin.

In addition, in the charge pump 300 of this variation, the second terminal of the output capacitor Co is connected not to the input terminal of the input voltage Vin but to the ground terminal.

Figure 23:
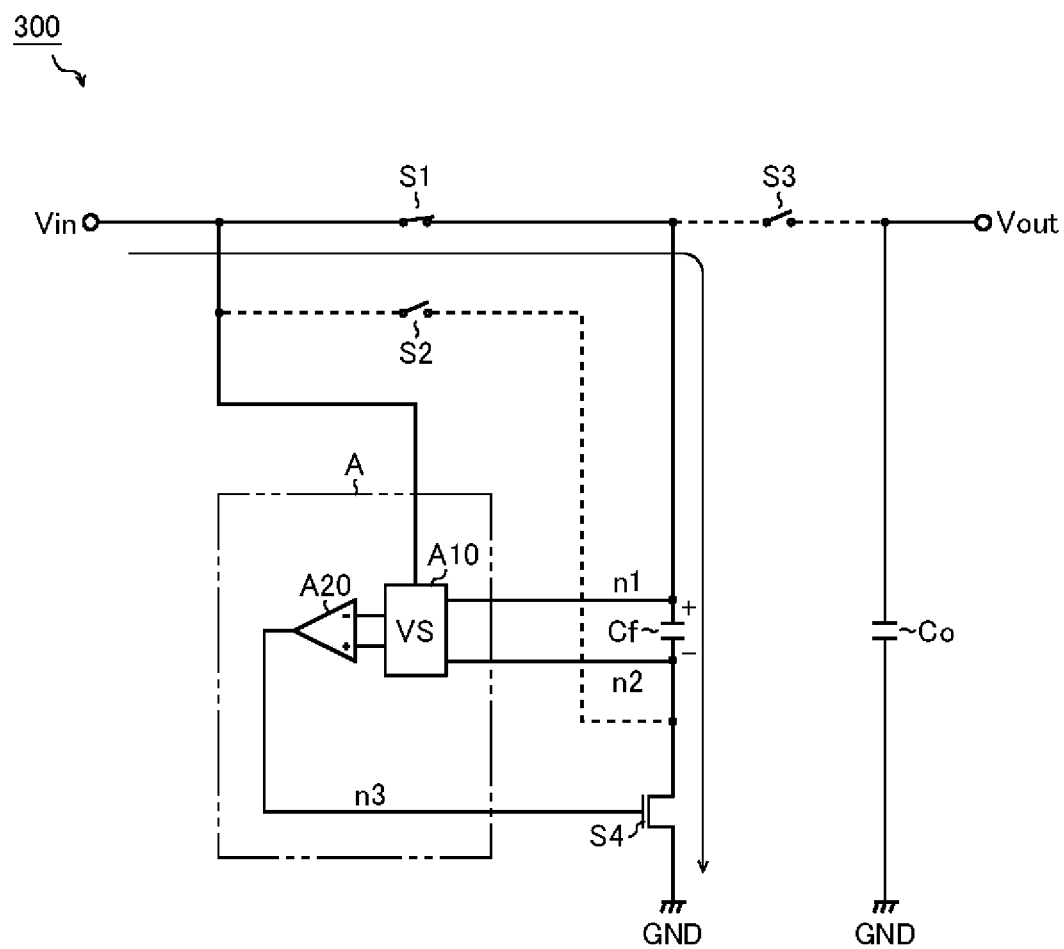
FIG. 23 is a circuit diagram showing an operating state in the first phase.

FIG. 23 is a circuit diagram showing an operating state of the charge pump 300 in the first phase. As shown in this diagram, in the first phase, the switches S2 and S3 are turned off while the switches S1 and S4 are turned on. As a result, current flows in the path from the input terminal of the input voltage Vin to the ground terminal via the flying capacitor Cf. In addition, in the first phase, by turning on/off the switch S4 according to the interterminal voltage Vx of the flying capacitor Cf, the second node voltage n2 is adjusted.

Further, in the first phase, the target value of the second node voltage n2 is variably controlled according to the input voltage Vin. More specifically, the target value of the second node voltage n2 is increased as the input voltage Vin is higher while it is decreased as the input voltage Vin is lower.

Figure 24:
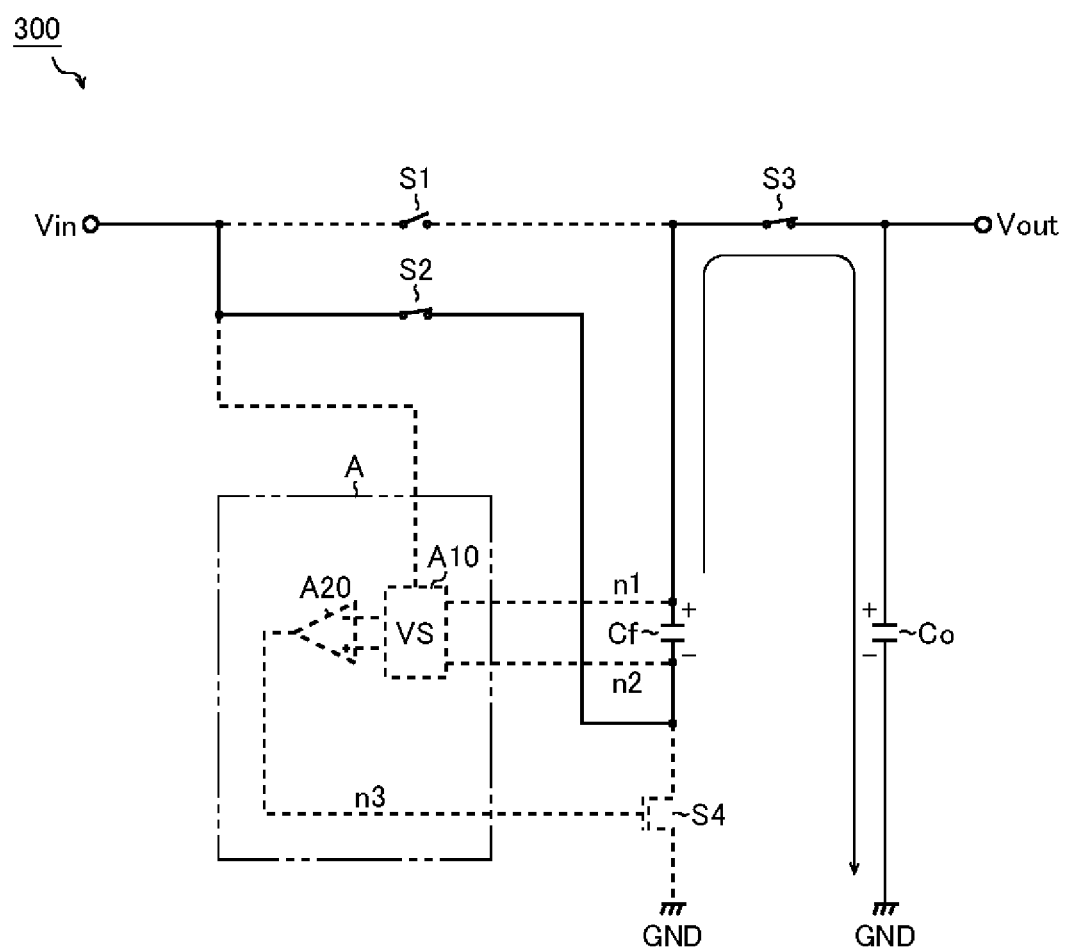
FIG. 24 is a circuit diagram showing an operating state in the second phase.

FIG. 24 is a circuit diagram showing an operating state of the charge pump 300 in the second phase. As shown in this diagram, in the second phase, the switches S2 and S3 are turned on while the switches S1 and S4 are turned off. As a result, the charge stored in the flying capacitor Cf is transferred to the output capacitor Co so that the output voltage Vout is increased.

Figure 25:
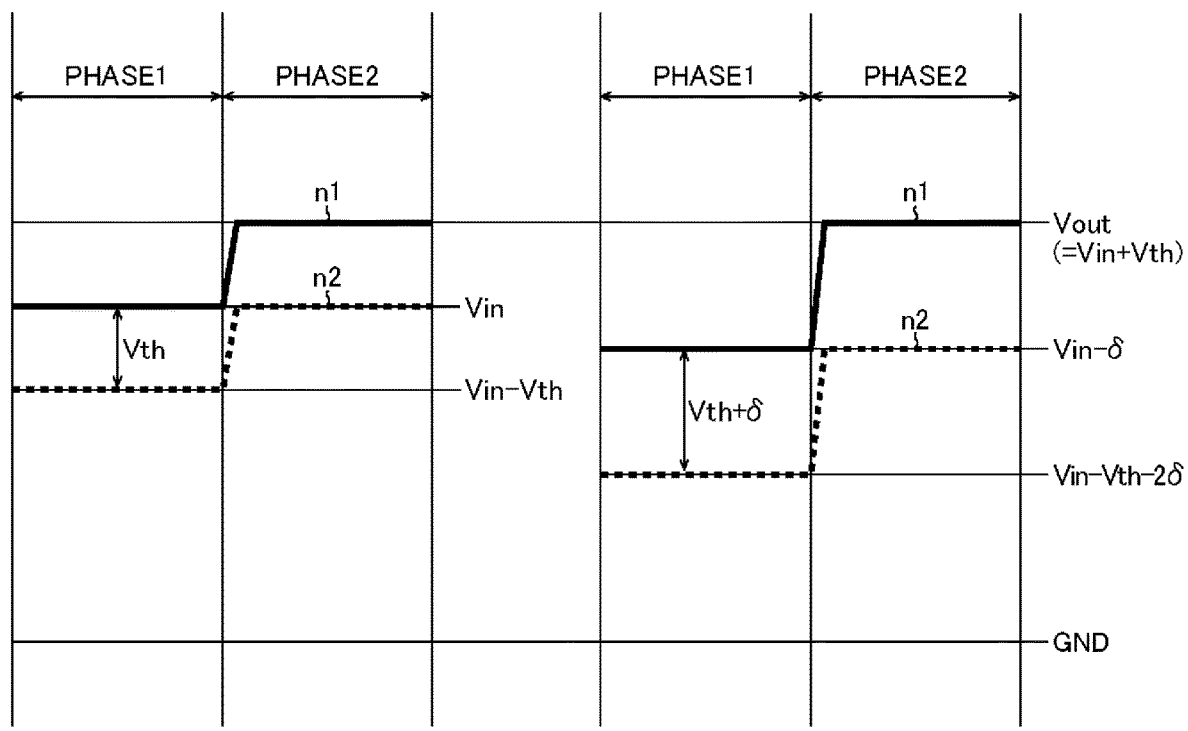
FIG. 25 is a voltage waveform chart showing a target change operation of the second node voltage.

FIG. 25 is a voltage waveform chart showing a target change operation of the second node voltage n2, in which transition behaviors of the first node voltage n1 (solid line) and the second node voltage n2 (broken line) between phases are shown.

First, with reference to the left side of this diagram, a behavior in a case where "Vin" is input as the input voltage is described in detail. In this case, in the first phase, n1 is nearly equal to Vin, while n2 is nearly equal to Vin-Vth.

Therefore, the flying capacitor Cf is charged until the interterminal voltage Vx (=n1−n2) becomes almost "Vth". After that, when the first phase is switched to the second phase, the second node voltage n2 is raised to almost Vin. In this case, according to charge conservation law of the flying capacitor Cf, the first node voltage n1 is raised to the output voltage Vout (≈Vin+Vth) that is the sum of the second node voltage n2 (≈Vin) and the interterminal voltage Vx of the flying capacitor Cf (≈Vth).

Next, with reference to the right side of this diagram, a behavior in a case where "Vin−δ" is input as the input voltage is described in detail. In this case, when the input voltage is decreased from "Vin" to "Vin−δ", the target value of the second node voltage n2 is raised from "Vin−Vth" to "(Vin−δ)−(Vth+δ)". In other words, in the first phase, n1 is nearly equal to Vin−δ, while n2 is nearly equal to Vin−Vth−2δ. Therefore, the flying capacitor Cf is charged until the interterminal voltage Vx (=n1−n2) becomes almost "Vth+δ".

After that, when the first phase is switched to the second phase, the second node voltage n2 is raised to almost Vin−δ. In this case, according to charge conservation law of the flying capacitor Cf, the first node voltage n1 is raised to the output voltage Vout (≈Vin+Vth) that is the sum of the second node voltage n2 (≈Vin−δ) and the interterminal voltage Vx of the flying capacitor Cf (≈Vth+δ).

In this way, the charge pump 300 of this variation can variably control the target value of the interterminal voltage Vx (i.e. target value of the second node voltage n2) according to the input voltage Vin when charging the flying capacitor Cf, and hence it can maintain the output voltage Vout at a constant value even if the input voltage Vin fluctuates. In particular, in a mobile terminal or the like, in which the input voltage Vin is supplied from the battery to the charge pump, the input voltage Vin is apt to fluctuate, and hence it has a large advantage to adopt this variation.

<Applications>

Figure 26:
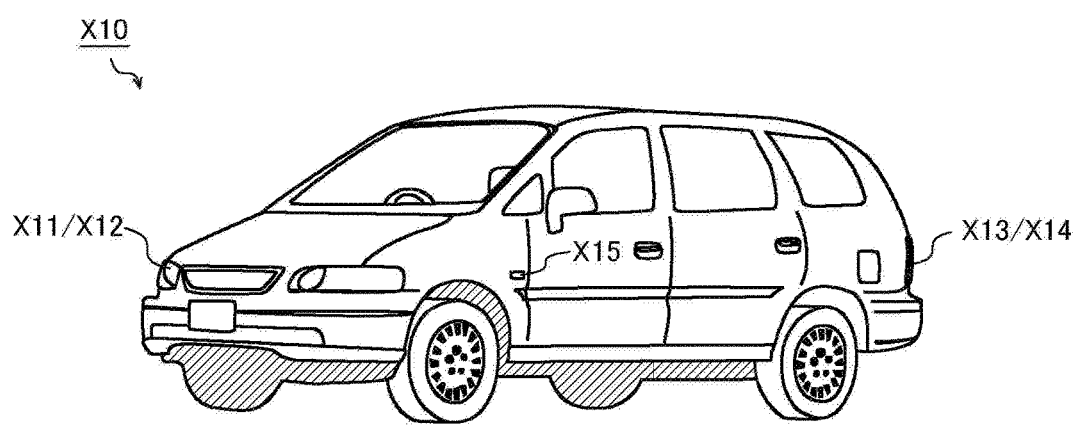
FIG. 26 is an external view (front) of the vehicle in which the lighting device is mounted.
Figure 27:
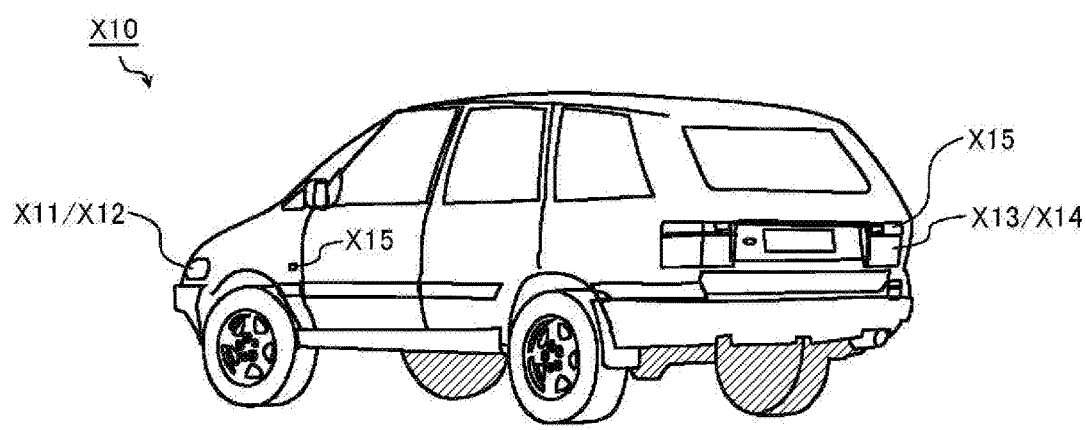
FIG. 27 is an external view (rear) of the vehicle in which the lighting device is mounted.

As shown in FIGS. 26 and 27, for example, the lighting device 1 can be appropriately used as a headlamp X11 (appropriately including a high beam, a low beam, a small lamp, a fog lamp, and the like), a daytime running lamp (DRL) X12, a tail lamp X13 (appropriately including a small lamp, a back lamp, and the like), a stop lamp X14, a turn lamp X15, and the like of a vehicle X10. In particular, the lighting device 1 having a sequential turn function is suitable as the turn lamp X15.

Figure 28:
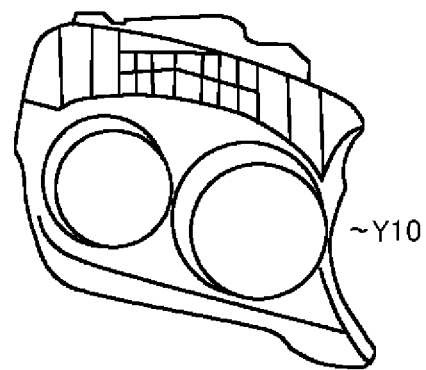
FIG. 28 is an external view of a headlamp module.
Figure 29:
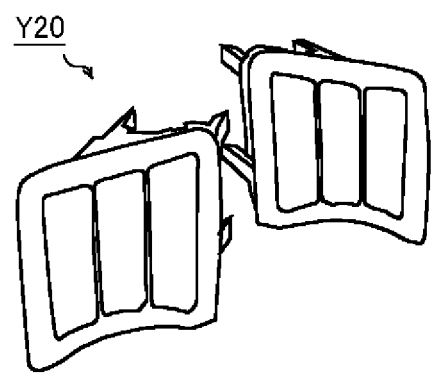
FIG. 29 is an external view of a turn lamp module.
Figure 30:
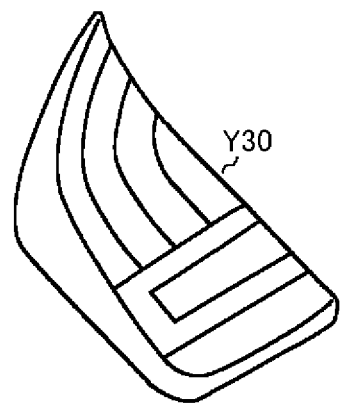
FIG. 30 is an external view of a rear lamp module.

In addition, the switch driver device 10 and the light emitting element driving device 20 described above may be provided as an in-vehicle lamp module (a headlamp module Y10 of FIG. 28, a turn lamp module Y20 of FIG. 29, a rear lamp module Y30 of FIG. 30, and the like) together with the light emitting element group 30 to be driven, or may be provided as a single IC independently of the light emitting element group 30.

<Other Variations>

Note that the structure using the light emitting diode as the light emitting element is exemplified and described in the embodiments described above, but the structure of the present invention is not limited to this. For example, it is possible to use an organic electro-luminescence (EL) element as the light emitting element.

In this way, in addition to the embodiments described above, various technical features disclosed in this specification can be variously modified within the scope of the technical invention without deviating from the spirit thereof. In other words, the embodiments described above are merely examples in every aspect and should not be understood as limitations. The technical scope of the present invention is defined not by the above description of the embodiments but by the claims, and should be understood to include all modifications within meanings and scopes equivalent to the claims.

INDUSTRIAL APPLICABILITY

The invention disclosed in this specification can be generally used in applications in which the step-up operation by the charge pump is necessary.

LIST OF REFERENCE SIGNS 1 lighting device (turn lamp module)
2 battery
3, 4 power supply switch
5 controller
10 switch driver device (matrix switch driver IC)
20 light emitting element driving device (LED driver IC)
30 light emitting element group (LED string)
100 switch portion
110 driver portion
120 logic portion
130 internal regulator portion
140 UVLO portion
150 current setting portion
160 oscillator portion
170 frequency setting portion
180 start delaying portion
190 first watchdog timer portion
200 second watchdog timer portion
210 selector portion
220 charge pump unit
230 open/short-circuit detection portion
300 charge pump
LED1 to LED8 light emitting element (light emitting diode)
R1 to R3 resistor
C1 to C5 capacitor
D1 to D3 diode
SW1 to SW8 switch element
DRV1 to DRV8 driver
Cf flying capacitor
Co output capacitor
S1 to S5 switch
A feedback control unit
A10 voltage detection unit
A11 resistor
A12 zener diode
A20 operational amplifier (voltage adjustment unit)
A30 hysteresis comparator (voltage adjustment unit)
A40 pulse generation unit
X, X10 vehicle
X11 headlamp
X12 daytime running lamp (DRL)
X13 tail lamp
X14 stop lamp
X15 turn lamp
Y10 headlamp module
Y20 turn lamp module
Y30 rear lamp module

The invention claimed is:

1. A charge pump comprising:
a flying capacitor;
an output capacitor;

a switch group arranged to switch connection states of the capacitors so as to generate an output voltage from an input voltage; and a feedback control unit arranged to adjust an interterminal voltage of the flying capacitor to a predetermined target value when charging the flying capacitor, wherein the switch group includes:

a first switch connected between a first terminal of the flying capacitor and an input terminal of the input voltage, a second switch connected between a second terminal of the flying capacitor and the input terminal of the input voltage, a third switch connected between the first terminal of the flying capacitor and an output terminal of the output voltage, a fourth switch connected between the second terminal of the flying capacitor and a ground terminal, and a fifth switch connected between the first terminal of the flying capacitor and an input terminal of a power supply voltage, wherein in a low input case where the input voltage is lower than the power supply voltage, the flying capacitor is charged using the power supply voltage, in a high input case where the input voltage is higher than the power supply voltage, the flying capacitor is charged using the input voltage.

2. The charge pump according to claim 1, wherein the feedback control unit adjusts a second node voltage at the second terminal of the flying capacitor on the basis of a first node voltage applied to the first terminal of the flying capacitor.

3. The charge pump according to claim 2, wherein the feedback control unit includes a voltage detection unit arranged to detect the interterminal voltage of the flying capacitor, and a voltage adjustment unit arranged to adjust the second node voltage according to a detection result by the voltage detection unit.

4. The charge pump according to claim 3, wherein the voltage detection unit includes a resistor having a first terminal connected to the first terminal of the flying capacitor, and a zener diode having a cathode connected to a second terminal of the resistor and an anode connected to the second terminal of the flying capacitor.

5. The charge pump according to claim 4, wherein the voltage adjustment unit includes an operational amplifier or a comparator arranged to drive the fourth switch according to an interterminal voltage of the resistor.

6. The charge pump according to claim 5, wherein the voltage adjustment unit further include a pulse generation unit arranged to generate a pulse signal for driving the switch group according to an output signal of the comparator.

7. The charge pump according to claim 1, wherein the feedback control unit variably controls a target value of the interterminal voltage according to the input voltage when charging the flying capacitor.

8. A switch driver device comprising:

a plurality of channels of switch elements connected in parallel to a plurality of light emitting elements, respectively;

a driver portion arranged to individually drive the plurality of switch elements; and the charge pump according to claim 1, arranged to receive a drive voltage of the plurality of light emitting elements as an input voltage and to output a drive voltage of the driver portion as an output voltage.

9. A lighting device comprising:

a plurality of light emitting elements;

a light emitting element driving device arranged to supply drive current to the plurality of light emitting elements, and the switch driver device according to claim 8.

10. A vehicle comprising the lighting device according to claim 9.

11. The charge pump according to claim 1, wherein in the low input case, the input voltage is lower than the target value, and in the high input case, the input voltage is higher than the target value.

12. The charge pump according to claim 1, wherein the power supply voltage is lower than or equal to the target value.

13. The charge pump according to claim 1, wherein in a first phase of the low input case, the first, second and third switches are turned off, while the fourth and fifth switches are turned on, and in a second phase of the low input case, the second and third switches are turned on, while the first, fourth and fifth switches are turned off.

14. The charge pump according to claim 13, wherein in the first phase of the low input case, the feedback control unit turns the fourth switch full-on.

15. The charge pump according to claim 1, wherein in a first phase of the high input case, the second, third and fifth switches are turned off, while the first and fourth switches are turned on, and in a second phase of the high input case, the second and third switches are turned on, while the first, fourth and fifth switches are turned off.

16. The charge pump according to claim 15, wherein in the first phase of the high input case, the feedback control unit controls conductivity of the fourth switch variably according to the interterminal voltage.

* * * * *